United States Patent
Yuda

(10) Patent No.: US 9,299,182 B2
(45) Date of Patent: Mar. 29, 2016

(54) DIVIDED-AREA-BASED RENDERING DEVICE AND DIVIDED-AREA-BASED RENDERING METHOD

(71) Applicant: Panasonic Corporation, Osaka (JP)

(72) Inventor: Masato Yuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 126 days.

(21) Appl. No.: 14/373,171

(22) PCT Filed: Oct. 30, 2013

(86) PCT No.: PCT/JP2013/006421
§ 371 (c)(1),
(2) Date: Jul. 18, 2014

(87) PCT Pub. No.: WO2014/087572
PCT Pub. Date: Jun. 12, 2014

(65) Prior Publication Data
US 2015/0015571 A1    Jan. 15, 2015

(30) Foreign Application Priority Data

Dec. 4, 2012    (JP) ................................. 2012-265790

(51) Int. Cl.
*G06T 15/00*    (2011.01)
(52) U.S. Cl.
CPC ........... *G06T 15/005* (2013.01); *G06T 2210/12* (2013.01)
(58) Field of Classification Search
None
See application file for complete search history.

(56) References Cited

U.S. PATENT DOCUMENTS

| 5,852,443 | A | * | 12/1998 | Kenworthy | ........... | G06T 11/001 |
| | | | | | | 345/441 |
| 8,368,691 | B2 | | 2/2013 | Howson | | |
| 8,681,168 | B2 | | 3/2014 | Nystad et al. | | |
| 2007/0146378 | A1 | | 6/2007 | Sorgard et al. | | |
| 2008/0150950 | A1 | | 6/2008 | Sorgard et al. | | |
| 2009/0256844 | A1 | | 10/2009 | Howson | | |
| 2010/0177105 | A1 | | 7/2010 | Nystad et al. | | |
| 2013/0194264 | A1 | | 8/2013 | Howson | | |

FOREIGN PATENT DOCUMENTS

| JP | 11-328441 | 11/1999 |
| JP | 2008-165760 | 7/2008 |

(Continued)

OTHER PUBLICATIONS

Jouppi, Norman P., and Chun-Fa Chang. "Z 3: an economical hardware technique for high-quality antialiasing and transparency." Proceedings of the ACM SIGGRAPH/EUROGRAPHICS workshop on Graphics hardware. ACM, 1999.*

(Continued)

*Primary Examiner* — Daniel Hajnik
(74) *Attorney, Agent, or Firm* — Wenderoth, Lind & Ponack, L.L.P.

(57) ABSTRACT

A divided-area-based rendering device includes: a table generating unit that calculates, for each unit polygon, a first area including the unit polygon, using screen coordinates, determines, from among divided areas obtained by dividing a rendering region, a divided area including at least part of the first area, and generates an area-by-polygon table that is a table in which, for each unit polygon, the divided area including the at least part of the first area including the unit polygon is associated with the unit polygon; a determining unit that determines a rendering unit polygon that is one of the unit polygons which is associated with the divided area, by referring to the area-by-polygon table; and an area rendering unit that performs, for each divided area, vertex processing and rasterization on the rendering unit polygon.

16 Claims, 32 Drawing Sheets

| Entry No | Minimum area ID | Maximum area ID | |
|---|---|---|---|
| 0 | (0, 0) | (4, 2) | Polygon 0, 1 |
| 1 | (0, 0) | (1, 2) | Polygon 8, 9 |
| 2 | (3, 3) | (4, 3) | Polygon 2 |
| 3 | (7, 3) | (0, 0) | Polygon 3 |
| 4 | (5, 0) | (7, 1) | Polygon 4 |
| 5 | (2, 2) | (3, 3) | Polygon 5 |
| 6 | (7, 3) | (0, 0) | Polygon 6 |
| 7 | (7, 3) | (0, 0) | Polygon 7 |

TMAX × 1 ≤ the number of polygons (10) ≤ TMAX × 2

(56) References Cited

FOREIGN PATENT DOCUMENTS

| | | |
|---|---|---|
| JP | 2010-165357 | 7/2010 |
| JP | 2011-515751 | 5/2011 |
| WO | 2009/115778 | 9/2009 |

OTHER PUBLICATIONS

International Search Report issued Jan. 7, 2014 in International Application No. PCT/JP2013/006421.

* cited by examiner

Boundary box = (1, 29)

Boundary box = ((1, 0), (5, 3))

| Polygon 431 | |
| --- | --- |
| Polygon 432 | |
| Polygon 433 | |
| Polygon 434 | Invalid flag ON |
| Polygon 435 | Start of clipping |
| Polygon 436 | Middle of clipping |
| Polygon 437 | End of clipping |
| Polygon 438 | Point |
| Polygon 439 | Line |

| Entry No | Minimum area ID | Maximum area ID | | |
|---|---|---|---|---|
| 0 | (0, 0) | (3, 2) | Polygon 431 | |
| 1 | (6, 3) | (6, 3) | Polygon 432 | |
| 2 | (3, 3) | (4, 3) | Polygon 433 | |
| 3 | (7, 3) | (0, 0) | Polygon 434 | Invalid flag ON |
| 4 | (5, 0) | (7, 1) | Polygon 435 to 437 | Clipping |
| ⋮ | ⋮ | ⋮ | | |
| TMAX-1 | | | | |

| Entry No | Minimum area ID | Maximum area ID | |
|---|---|---|---|
| 0 | (0, 0) | (3, 2) | Polygon 0 |
| 1 | (4, 0) | (4, 0) | Polygon 1 |
| 2 | (3, 3) | (4, 3) | Polygon 2 |
| 3 | (7, 3) | (0, 0) | Polygon 3 |
| 4 | (5, 0) | (7, 1) | Polygon 4 |
| 5 | (2, 2) | (3, 3) | Polygon 5 |
| 6 | (7, 3) | (0, 0) | Polygon 6 |
| 7 | | | |

The number of polygons (7) ≤ TMAX × 1

| Entry No | Minimum area ID | Maximum area ID | |
|---|---|---|---|
| 0 | (0, 0) | (3, 3) | Polygon 0, 8 |
| 1 | (4, 0) | (4, 0) | Polygon 1 |
| 2 | (3, 3) | (4, 3) | Polygon 2 |
| 3 | (7, 3) | (0, 0) | Polygon 3 |
| 4 | (5, 0) | (7, 1) | Polygon 4 |
| 5 | (2, 2) | (3, 3) | Polygon 5 |
| 6 | (7, 3) | (0, 0) | Polygon 6 |
| 7 | (7, 3) | (0, 0) | Polygon 7 |

TMAX × 1 ≤ the number of polygons (9) ≤ TMAX × 2

| Entry No | Minimum area ID | Maximum area ID | |
|---|---|---|---|
| 0 | (0, 0) | (3, 2) | Polygon 0 |
| 1 | (4, 0) | (4, 0) | Polygon 1 |
| 2 | (3, 3) | (4, 3) | Polygon 2 |
| 3 | (7, 3) | (0, 0) | Polygon 3 |
| 4 | (5, 0) | (7, 1) | Polygon 4 |
| 5 | (2, 2) | (3, 3) | Polygon 5 |
| 6 | (7, 3) | (0, 0) | Polygon 6 |
| 7 | (7, 3) | (0, 0) | Polygon 7 |

The number of polygons (7) ≤ TMAX × 1

FIG. 16B
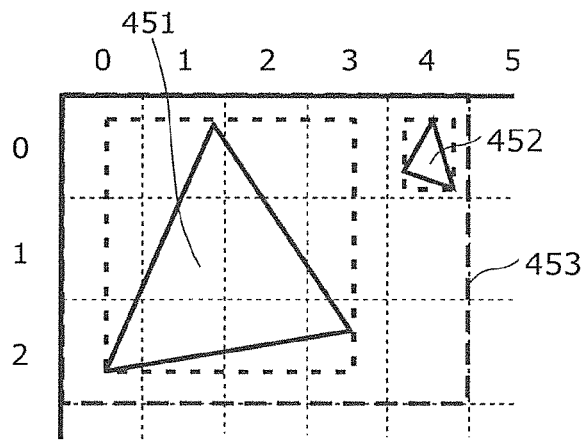
FIG. 16C
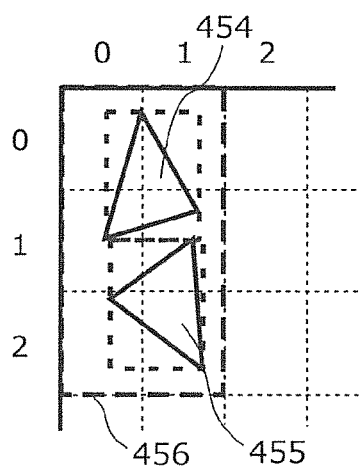
FIG. 16D
| Entry No | Minimum area ID | Maximum area ID | |
|---|---|---|---|
| 0 | (0, 0) | (4, 2) | Polygon 0, 1 |
| 1 | (0, 0) | (1, 2) | Polygon 8, 9 |
| 2 | (3, 3) | (4, 3) | Polygon 2 |
| 3 | (7, 3) | (0, 0) | Polygon 3 |
| 4 | (5, 0) | (7, 1) | Polygon 4 |
| 5 | (2, 2) | (3, 3) | Polygon 5 |
| 6 | (7, 3) | (0, 0) | Polygon 6 |
| 7 | (7, 3) | (0, 0) | Polygon 7 |
TMAX × 1 ≤ the number of polygons (10) ≤ TMAX × 2

FIG. 17A

| Entry No | Area information |
|---|---|
| 0 | Polygon 0, 1 |
| 1 | Polygon 8, 9 |
| 2 | Polygon 2, 3 |
| 3 | Polygon 10, 11 |
| 4 | Polygon 4, 5 |
| 5 | Polygon 12, 13 |
| 6 | Polygon 6, 7 |
| 7 | Polygon 14, 15 |

The number of polygons (16) ≤ TMAX × 2

FIG. 17B

| Entry No | Area information |
|---|---|
| 0 | Polygon 0, 1, 2, 3 |
| 1 | Polygon 8, 9 |
| 2 | Polygon 16 |
| 3 | Polygon 10, 11 |
| 4 | Polygon 4, 5 |
| 5 | Polygon 12, 13 |
| 6 | Polygon 6, 7 |
| 7 | Polygon 14, 15 |

TMAX × 2 ≤ the number of polygons (17) ≤ TMAX × 3

FIG. 17C

| Entry No | Area information |
|---|---|
| 0 | Polygon 0, 1, 2, 3 |
| 1 | Polygon 8, 9 |
| 2 | Polygon 16, 17, 18, 19 |
| 3 | Polygon 10, 11 |
| 4 | Polygon 4, 5, 6, 7 |
| 5 | Polygon 12, 13 |
| 6 | Polygon 20, 21, 22, 23 |
| 7 | Polygon 14, 15 |

TMAX × 3 ≤ the number of polygons (24) ≤ TMAX × 4

FIG. 17D

| Entry No | Area information |
|---|---|
| 0 | Polygon 0, 1, 2, 3 |
| 1 | Polygon 8, 9, 10, 11 |
| 2 | Polygon 16, 17, 18, 19 |
| 3 | Polygon 24 |
| 4 | Polygon 4, 5, 6, 7 |
| 5 | Polygon 12, 13 |
| 6 | Polygon 20, 21, 22, 23 |
| 7 | Polygon 14, 15 |

TMAX × 3 ≤ the number of polygons (25) ≤ TMAX × 4

FIG. 17E

| Entry No | Area information |
|---|---|
| 0 | Polygon 0, 1, 2, 3 |
| 1 | Polygon 8, 9, 10, 11 |
| 2 | Polygon 16, 17, 18, 19 |
| 3 | Polygon 24, 25, 26, 27 |
| 4 | Polygon 4, 5, 6, 7 |
| 5 | Polygon 12, 13, 14, 15 |
| 6 | Polygon 20, 21, 22, 23 |
| 7 | Polygon 28, 29, 30, 31 |

The number of polygons (32) ≤ TMAX × 4

FIG. 17F

| Entry No | Area information |
|---|---|
| 0 | Polygon 0 to 7 |
| 1 | Polygon 8, 9, 10, 11 |
| 2 | Polygon 16, 17, 18, 19 |
| 3 | Polygon 24, 25, 26, 27 |
| 4 | Polygon 32 |
| 5 | Polygon 12, 13, 14, 15 |
| 6 | Polygon 20, 21, 22, 23 |
| 7 | Polygon 28, 29, 30, 31 |

TMAX × 4 ≤ the number of polygons (33) ≤ TMAX × 5

| | Divided area (unit area) | | | | | | | | | | Minimum area ID | Maximum area ID |
|---|---|---|---|---|---|---|---|---|---|---|---|---|
| | 0 | 1 | 2 | 3 | 4 | 5 | 6 | ··· | 62 | 63 | | |
| Entry No 0 | 0 | 0 | 0 | 0 | 0 | 0 | 1 | ··· | 0 | 0 | (14, 0) | (16, 4) |
| Entry No 1 | 0 | 0 | 0 | 0 | 0 | 0 | 0 | ··· | 0 | 0 | (3, 3) | (5, 6) |
| Entry No 2 | | | | | | | | | | | | |
| Entry No 3 | | | | | | | | | | | | |

| Entry No | Minimum area ID | Maximum area ID | The number of polygons (the number of entries) | |
|---|---|---|---|---|
| 0 | (1, 1) | (6, 6) | 4 | Polygon group 485 |
| 1 | | | | |
| 2 | | | | |

DIVIDED-AREA-BASED RENDERING DEVICE AND DIVIDED-AREA-BASED RENDERING METHOD

TECHNICAL FIELD

The present invention relates to three-dimensional graphics rendering, and in particular to a divided-area-based rendering device that performs processing for each of divided areas obtained by dividing a rendering region.

BACKGROUND ART

In the three-dimensional graphics rendering, known is a technique for dividing a rendering region into rectangular areas (blocks or tiles) and processing the rectangular areas. In this technique, an internal memory accessible at a high speed is used as a memory for the rectangular areas. With this, an external memory is not accessed while the memory of the rectangular areas is accessed for rasterization, and thus it is possible to reduce a memory bandwidth and power consumption (see Patent Literature (PTL) 1, for instance).

CITATION LIST

Patent Literature

[PTL 1] Japanese Unexamined Patent Application Publication No. 2011-515751

SUMMARY OF INVENTION

Technical Problem

A divided-area-based rendering device that performs area division is expected to reduce an amount of intermediate data used for rendering.

In view of this, an object of the present invention is to provide a divided-area-based rendering device that performs area division and reduces an amount of intermediate data used for rendering.

Solution to Problem

A divided-area-based rendering device according to one aspect of the present invention includes: a command receiving unit configured to receive a rendering command indicating a plurality of unit polygons which are to be rendered in a rendering region and each of which includes one or more polygons; a coordinate converting unit configured to convert, for each of the unit polygons indicated in the rendering command, vertex coordinates of the unit polygon in a three-dimensional space into screen coordinates in a two-dimensional plane; a table generating unit configured to, (i) for each unit polygon, calculate a first area including the unit polygon in the two-dimensional plane, using the screen coordinates, and compute, among a plurality of divided areas obtained by dividing the rendering region, a divided area including at least part of the first area, and (ii) generate, using results of the computation for the unit polygons, an area table that is a table in which, for each unit polygon, the divided area including the at least part of the first area including the unit polygon is associated with the unit polygon; a determining unit configured to determine a rendering unit polygon for each of the divided areas by referring to the area table, the rendering unit polygon being one of the unit polygons which is associated with the divided area; and an area rendering unit configured to perform, for each divided area, vertex processing and rasterization on the rendering unit polygon.

It is to be noted that this generic and specific aspect may be implemented using a system, a method, an integrated circuit, a computer program, or a non-transitory computer-readable recording medium such as a compact disc read-only memory (CD-ROM), and may also be implemented by any combination of systems, methods, integrated circuits, computer programs, and recording media.

Advantageous Effects of Invention

The present invention can provide a divided-area-based rendering device that performs area division and reduces an amount of intermediate data used for rendering.

BRIEF DESCRIPTION OF DRAWINGS

FIG. 16B is a diagram for describing integration processing according to Embodiment 1.

FIG. 16C is a diagram for describing integration processing according to Embodiment 1.

FIG. 16D is a diagram illustrating an area-by-polygon table at time of integration processing according to Embodiment 1.

FIG. 17A is a diagram illustrating an area-by-polygon table at time of integration processing according to Embodiment 1.

FIG. 17B is a diagram illustrating an area-by-polygon table at time of integration processing according to Embodiment 1.

FIG. 17C is a diagram illustrating an area-by-polygon table at time of integration processing according to Embodiment 1.

FIG. 17D is a diagram illustrating an area-by-polygon table at time of integration processing according to Embodiment 1.

FIG. 17E is a diagram illustrating an area-by-polygon table at time of integration processing according to Embodiment 1.

FIG. 17F is a diagram illustrating an area-by-polygon table at time of integration processing according to Embodiment 1.

DESCRIPTION OF EMBODIMENTS

Underlying Knowledge Forming Basis of the Present Invention

In relation to the conventional technique, the inventors have found the following problem.

The technique for dividing a rendering region into rectangular areas and processing the rectangular areas has the unique divided-area-based rendering problem that to process the rectangular areas, a polygon included in a scene needs to be loaded as many times as the number of the rectangular areas.

In order to solve this problem, it is possible to apply a method for holding, for each divided area (rectangular area), a visible polygon list and referring only to the visible polygon list of the divided area when the divided area is rendered. The following describes this method.

Figure 1:
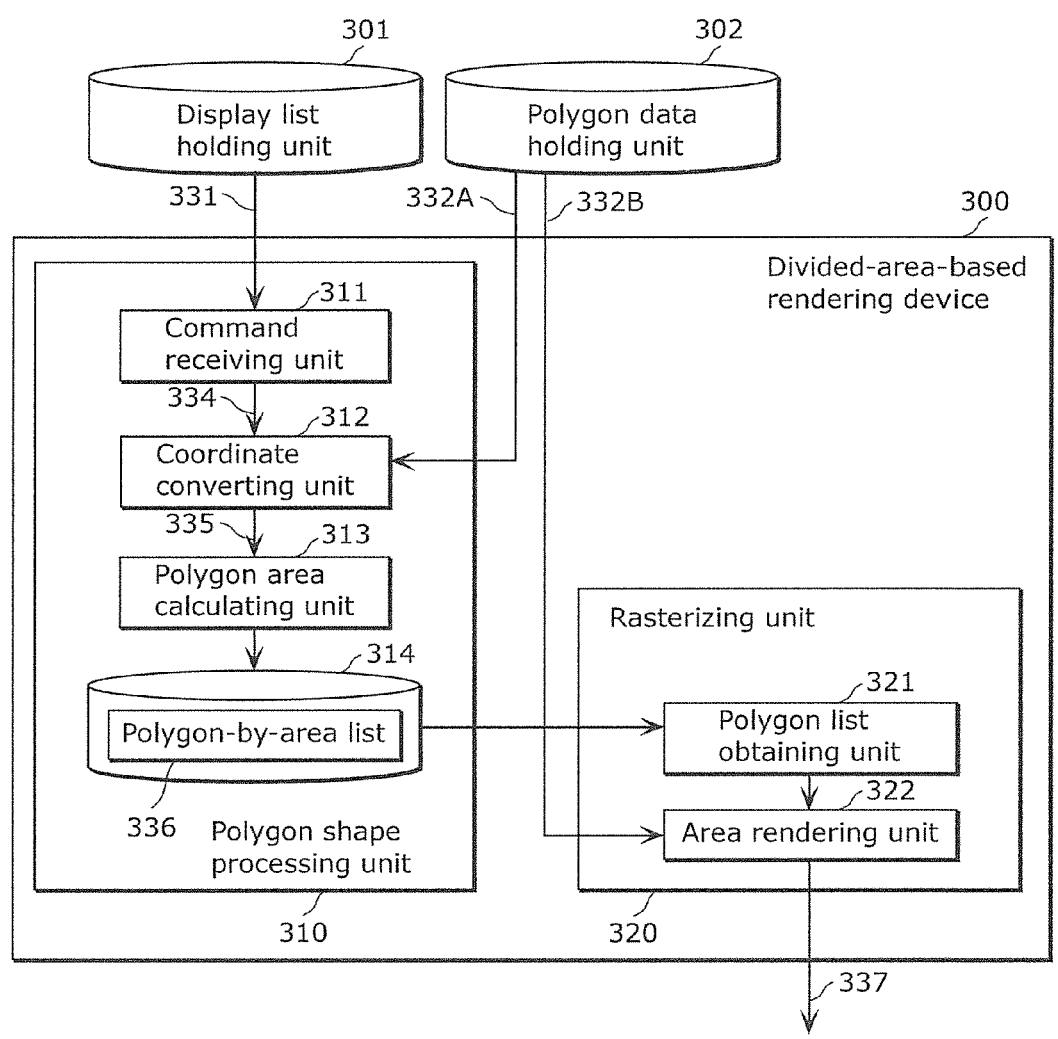
FIG. 1 is a block diagram illustrating a configuration of a divided-area-based rendering device according to a comparative example.

FIG. 1 is a block diagram illustrating a divided-area-based rendering device 300 according to a comparative example of the present invention.

The divided-area-based rendering device 300 shown in FIG. 1 includes a polygon shape processing unit 310 and a rasterizing unit 320.

The polygon shape processing unit 310 includes a command receiving unit 311, a coordinate converting unit 312, a polygon area calculating unit 313, and a list holding unit 314.

The command receiving unit 311 fetches a display list 331 held in a display list holding unit 301, and decodes the display list 331 into a rendering command 334.

The coordinate converting unit 312 fetches, from a polygon data holding unit 302, vertex coordinates 332A indicating a shape of a polygon that is to be rendered and is indicated in the rendering command 334, and converts the vertex coordinates 332A into screen coordinates 335.

The polygon area calculating unit 313 determines, by culling, whether polygons are visible or invisible, using the screen coordinates 335. Next, the polygon area calculating unit 313 determines, for each divided area, whether a polygon determined to be visible is visible, and generates a polygon-by-area list 336 indicating, for each divided area, the visible polygon.

The list holding unit 314 holds the polygon-by-area list 336.

As stated above, the polygon shape processing unit 310 does not rasterize all polygons in a scene, but generates the polygon-by-area list 336. The polygon-by-area list 336 is a list that indicates polygons which potentially belong to respective divided areas.

The rasterizing unit 320 includes a polygon list obtaining unit 321 and an area rendering unit 322. The polygon list obtaining unit 321 obtains the polygon-by-area list 336 generated by the polygon shape processing unit 310.

The area rendering unit 322 loads, for each divided area, polygon data 332B of a polygon visible in a divided area to be processed and indicated in the polygon-by-area list 336, performs vertex processing and rasterization on the polygon data 332B, and transfers, to an external memory, pixel data 337 resulting from the processing and the rasterization.

The polygon-by-area list 336 holds information indicating a polygon determined to be visible in a divided area. The area rendering unit 322 fetches, from the polygon data holding unit 302, the polygon data 332B including unconverted polygon information and vertex attribute data representing the polygon, and performs the vertex processing, the rasterization, and transfer processing on the polygon data 332B. At this time, reading and writing of pixels by a blend are performed on a rendering internal memory accessible at a high speed, using the rendering internal memory as a memory for the divided areas. With this, the external memory is not accessed, and thus it is possible to produce effects such as a reduction in a memory bandwidth and a reduction in power consumption.

As just described, in the divided-area-based rendering device 300 according to the comparative example, the polygon shape processing unit 310 generates and holds the polygon-by-area list 336 that indicates, for each divided area, the visible polygon. With this, it is possible to achieve divided-area-based rendering without loading unnecessary polygon data at the time of the rasterization.

With the configuration of the comparative example, however, polygon information is held for each divided area. As a result, the inventors have found that when a lot of visible polygons are in a scene, a memory region for generating and holding the polygon-by-area list 336 increases in size.

In an extreme example, if a polygon spreads over all divided areas, information about the polygon is registered for all the divided areas in the polygon-by-area list 336. For this reason, in the worst scenario, the polygon-by-area list 336 is required to hold information items as many as the number of the divided areas×the number of all polygons. Thus, a lot of memory regions are necessary.

Moreover, the size of the memory region for the polygon-by-area list 336 cannot be fixed until the polygon shape processing unit 310 actually performs processing. Consequently, the inventors have found that the divided-area-based processing must be interrupted for a scene including visible polygons whose information exceeds the capacity of a previously reserved memory region.

A divided-area-based rendering device according to one aspect of the present invention includes: a command receiving unit configured to receive a rendering command indicating a plurality of unit polygons which are to be rendered in a rendering region and each of which includes one or more polygons; a coordinate converting unit configured to convert, for each of the unit polygons indicated in the rendering command, vertex coordinates of the unit polygon in a three-dimensional space into screen coordinates in a two-dimensional plane; a table generating unit configured to, (i) for each unit polygon, calculate a first area including the unit polygon in the two-dimensional plane, using the screen coordinates, and compute, among a plurality of divided areas obtained by dividing the rendering region, a divided area including at least part of the first area, and (ii) generate, using results of the computation for the unit polygons, an area table that is a table in which, for each unit polygon, the divided area including the at least part of the first area including the unit polygon is associated with the unit polygon; a determining unit configured to determine a rendering unit polygon for each of the divided areas by referring to the area table, the rendering unit polygon being one of the unit polygons which is associated with the divided area; and an area rendering unit configured to perform, for each divided area, vertex processing and rasterization on the rendering unit polygon.

With this configuration, the divided-area-based rendering device is capable of generating the area table indicating, for each polygon unit, the divided area included in the first area corresponding to the unit polygon, and determining the target unit polygon for the target divided area, by referring to the area table in divided-area-based rendering. Thus, for instance, the divided-area-based rendering device is capable of reducing an amount of data of the table when a lot of unit polygons to be rendered are present, as compared to a case where a table indicating, for each divided area, a polygon to be processed is used.

For example, the area table may include a fixed number of entries, the table generating unit may store, into each of the entries, area information indicating the divided area including the at least part of the first area and associated with the unit polygon, when the number of the unit polygons is greater than the fixed number, the table generating unit may: divide the unit polygons into the fixed number of groups each of which includes at least one unit polygon; for each of the fixed number of the groups, calculate, a second area including the at least one unit polygon in the two-dimensional plane which is included in the group, using the screen coordinates, and compute, among the divided areas, a divided area including at least part of the second area; and generate, using results of the computation for the fixed number of the groups, the area table that is a table in which, for each group, the divided area including the at least part of the second area including the at least one unit polygon included in the group is associated with the group, and the determining unit may determine the rendering unit polygon for each of the divided areas by referring to the area table, the rendering unit polygon being, among the unit polygons, a unit polygon included in the group associated with the divided area.

With this configuration, the divided-area-based rendering device is capable of generating the area table having a predetermined amount of data, even when a lot of unit polygons to be rendered are present.

For instance, the table generating unit may: sequentially select, as a target unit polygon, one of the unit polygons; generate, for each of the selected target unit polygons, the area information about the target unit polygon, and store the area information into, among the entries, an entry that does not hold the area information; determine, when storing area information about a new unit polygon into an entry, whether the number of area information items stored in the area table is greater than the fixed number as a result of storing the area information; calculate, when the number of the area information items is greater than the fixed number, the second area including the new unit polygon and the unit polygon corresponding to the area information stored in a selected entry that is one of the entries, using the area information stored in the selected entry and the area information about the new unit polygon; and store, into the selected entry, the area information indicating the divided area including the at least part of the calculated second area.

For example, the table generating unit may: sequentially select, as a target unit polygon, one of the unit polygons; generate, for each of the selected target unit polygons, the area information about the target unit polygon, and store the area information into, among the entries, an entry that does not hold the area information; determine, when storing area information about a new unit polygon into an entry, whether the number of area information items stored in the area table is greater than the fixed number as a result of storing the area information; calculate, when the number of the area information items is greater than the fixed number, the second area including the unit polygon corresponding to the area information stored in a first entry among the entries and the unit polygon corresponding to the area information stored in a second entry among the entries, using the two area information items stored in the first entry and the second entry; store, into the first entry, the area information indicating the divided area including the at least part of the calculated second area; and store, into the second entry, the area information about the new unit polygon.

With this configuration, the divided-area-based rendering device is capable of storing area information items about unit polygons adjacent to each other in rendering order, into one entry. Since generally the unit polygons adjacent to each other in rendering order often have relatively close rendering locations, the divided-area-based rendering device is capable of increasing the accuracy of the area information items.

For instance, the first area may be a smallest rectangular area including all the unit polygons.

With this configuration, the divided-area-based rendering device is capable of reducing the amount of data of the area information.

For example, the area information may indicate, among vertices of the first area, vertices that are diagonal to each other.

With this configuration, the divided-area-based rendering device is capable of reducing the amount of data of the area information.

For instance, the area information has a predetermined number of bits each one of which is associated with a different one of unit areas each including one or more of the divided areas, and the one bit indicates whether the unit area associated with the one bit includes the at least part of the first area corresponding to the unit polygon corresponding to the entry.

With this configuration, when the unit polygons are divided into the fixed number of groups, the divided-area-based rendering device is capable of suppressing the designation of an unnecessary area in area information.

For example, the area information may include: first information indicating a divided area including, among vertices of the first area, vertices that are diagonal to each other; and second information having a predetermined number of bits each of which is associated with a different one of unit areas each including the divided areas, the one bit indicates whether the associated unit area includes the at least part of the first area corresponding to the unit polygon corresponding to the entry, and the determining unit may determine a unit polygon as the rendering unit polygon for each of the divided areas, the unit polygon being one of the unit polygons which is associated with the divided area in the first information and with the unit area including the divided area in the second information.

With this configuration, when the unit polygons are divided into the fixed number of groups, the divided-area-based rendering device is capable of suppressing the designation of an unnecessary area in area information and the decrease in accuracy of designating an area.

For instance, the coordinate converting unit may further determine, using the screen coordinates, whether each of the unit polygons is a valid unit polygon or an invalid unit polygon, the valid unit polygon being a unit polygon at least part of which is displayed in the rendering region, and the invalid unit polygon being a unit polygon whole of which is not displayed in the rendering region, the table generating unit may store the area information into the entry when the target unit polygon is the invalid unit polygon, the area information indicating that the target unit polygon is the invalid unit polygon, and the determining unit may exclude the target unit polygon from a rendering target when the area information in the area table indicates that the target unit polygon is the invalid unit polygon.

With this configuration, the determining unit is capable of easily determining which unit polygon each entry included in the area table belongs to.

For example, the coordinate converting unit may further divide the unit polygon into a plurality of divided unit polygons by clipping using the screen coordinates, and the table generating unit may calculate the first area including all of the divided unit polygons when the clipping is performed on the target unit polygon, and store, into one of the entries, the area information indicating the divided area including the at least part of the calculated first area.

With this configuration, the divided-area-based rendering device is capable of storing area information items about the unit polygons divided by clipping, into one entry.

For instance, the table generating unit may sequentially select, as target unit polygons, the unit polygons according to an order of data of the unit polygons included in the rendering command, and the determining unit may associate, using the order, the unit polygons and the area information items stored in the entries.

With this configuration, the determining unit is capable of easily determining which unit polygon each entry included in the area table corresponds to.

For example, the coordinate converting unit may further determine, using the screen coordinates, whether each of the unit polygons is a valid unit polygon or an invalid unit polygon, the valid unit polygon being a unit polygon at least part of which is displayed in the rendering region, and the invalid unit polygon being a unit polygon whole of which is not displayed in the rendering region, the table generating unit may further count, among the unit polygons, the number of the valid unit polygons that are consecutive and the number of the invalid unit polygons that are consecutive, and generate a polygon attribute table indicating the number of the consecutive valid unit polygons and the number of the consecutive invalid unit polygons, and the determining unit may further determine, by referring to the polygon attribute table, whether each of the unit polygons is the valid unit polygon or the invalid unit polygon, and determine the rendering unit polygon for each of the divided areas by referring to the area table, the rendering unit polygon being one of the valid unit polygons which is associated with the divided area.

With this configuration, only the area information about the valid unit polygon is stored into the area table. This allows the divided-area-based rendering device to reduce the amount of data of the area table.

For instance, the unit polygon may be a polygon group including a plurality of polygons, the table generating unit may generate, as the area table, (i) a first area table that is a table in which, for each of a plurality of the polygon groups, the divided area including the at least part of the first area including the polygon group is associated with the polygon group and (ii) a second area table that is a table in which, for each of the polygons, the divided area including the at least part of the first area including the polygon is associated with the polygon, the determining unit may determine, for each of the divided areas: a rendering polygon group by referring to the first area table, the rendering polygon group being one of the polygon groups which is associated with the divided area; and a rendering polygon by referring to the second area table, the rendering polygon being one of the polygons which is associated with the divided area, and the area rendering unit may perform, for each divided area, the vertex processing and the rasterization on the rendering polygon.

With this configuration, the divided-area-based rendering device is capable of reducing an amount of processing in the determination processing, using the determination on a polygon-group-by-polygon group basis and the determination on a polygon-by-polygon basis.

It is to be noted that these generic and specific aspects may be implemented using a system, a method, an integrated circuit, a computer program, or a non-transitory computer-readable recording medium such as a compact disc read-only memory (CD-ROM), and may also be implemented by any combination of systems, methods, integrated circuits, computer programs, and recording media.

Hereinafter, a divided-area-based rendering device according to one aspect of the present invention is described in detail with reference to the drawings.

It is to be noted that the exemplary embodiments described below each show a general or specific example. The numerical values, shapes, materials, structural elements, the arrangement and connection of the structural elements etc. shown in the following embodiments are mere examples, and therefore do not limit the present invention. In addition, among the structural elements in the following embodiments, structural elements not recited in any one of the independent claims are described as arbitrary structural elements.

Embodiment 1

A divided-area-based rendering device according to Embodiment 1 determines, for each of polygons, a divided area including the polygon from among divided areas, and generates an area-by-polygon table that is a table in which, for each polygon, the divided area included in the polygon is associated with the polygon. Then, the divided-area-based rendering device determines, for each divided area, a polygon to be processed that is, among the polygons, a polygon associated with a divided area to be processed in the area-by-polygon table.

With this, the divided-area-based rendering device is capable of reducing an amount of data of the table when a lot of polygons to be processed are present, as compared to a case where a table indicating, for each divided area, a polygon to be processed is used.

First, the following describes a basic configuration of the divided-area-based rendering device according to this embodiment.

Figure 2:
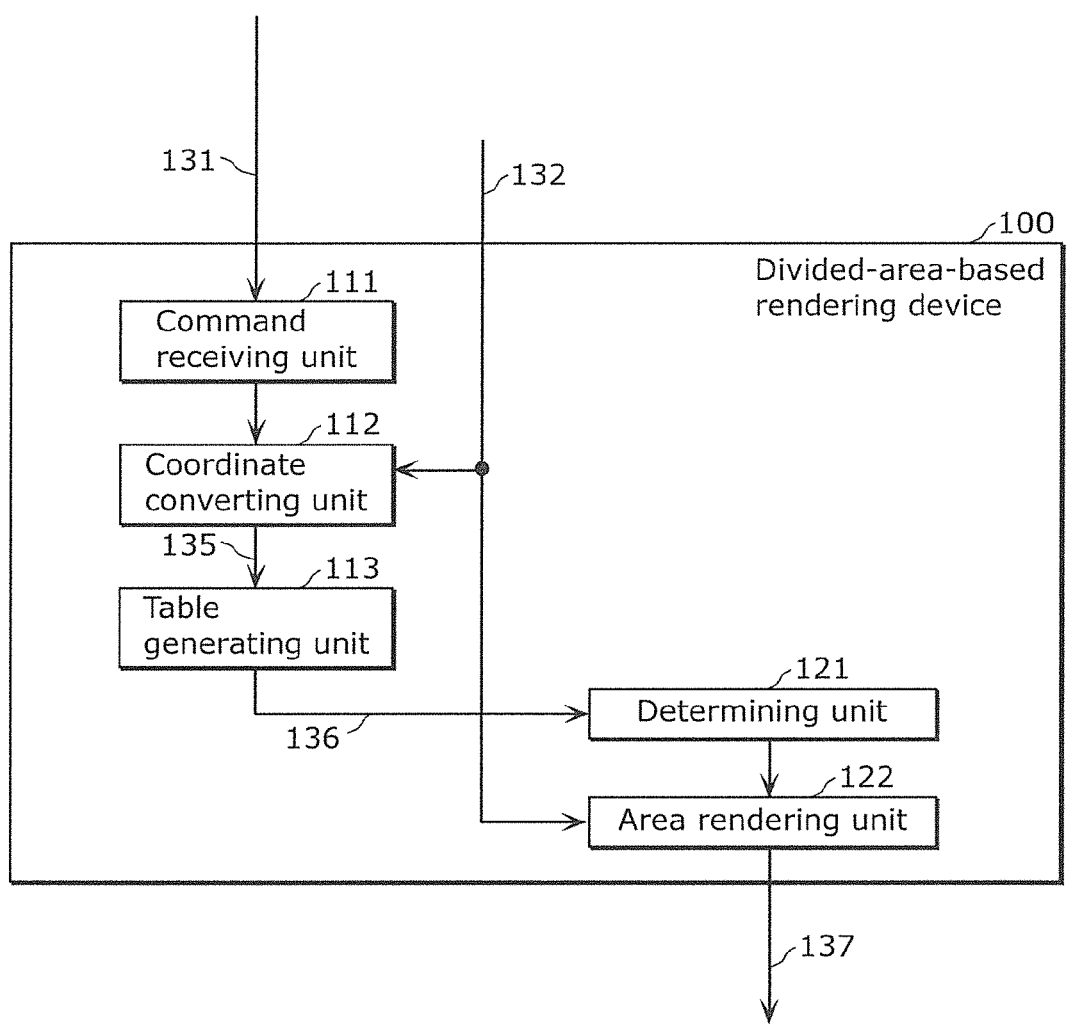
FIG. 2 is a block diagram illustrating a configuration of a divided-area-based rendering device according to Embodiment 1.

FIG. 2 is a block diagram illustrating a configuration of a divided-area-based rendering device 100 according to this embodiment. The divided-area-based rendering device 100 shown in FIG. 2 includes a command receiving unit 111, a coordinate converting unit 112, a table generating unit 113, a determining unit 121, and an area rendering unit 122.

The command receiving unit 111 receives a rendering command 131 indicating polygons to be rendered in a rendering region.

The coordinate converting unit 112 obtains, for each of the polygons indicated in the rendering command 131, polygon data 132 including vertex coordinates of the polygon in a three-dimensional space, and converts the vertex coordinates into screen coordinates 135 in a two-dimensional plane.

The table generating unit 113 calculates, for each polygon, a first area including the polygon in the two-dimensional plane, using the screen coordinates 135 of the polygon. Next, the table generating unit 113 computes, for each polygon, among divided areas obtained by dividing the rendering region, a divided area including at least part of the first area. Subsequently, the table generating unit 113 generates, using the computation results for the polygons, an area-by-polygon table 136 that is a table in which, for each polygon, the divided area including the at least part of the first area including the polygon is associated with the polygon.

The determining unit 121 determines, for each of the divided areas, a rendering polygon that is one of the polygons which is associated with a divided area to be processed, by referring to the area-by-polygon table 136.

The area rendering unit 122 generates, for each divided area, pixel data 137 by performing vertex processing and rasterization on the rendering polygon.

Hereinafter, a detailed configuration of the divided-area-based rendering device 100 is described.

Figure 3:
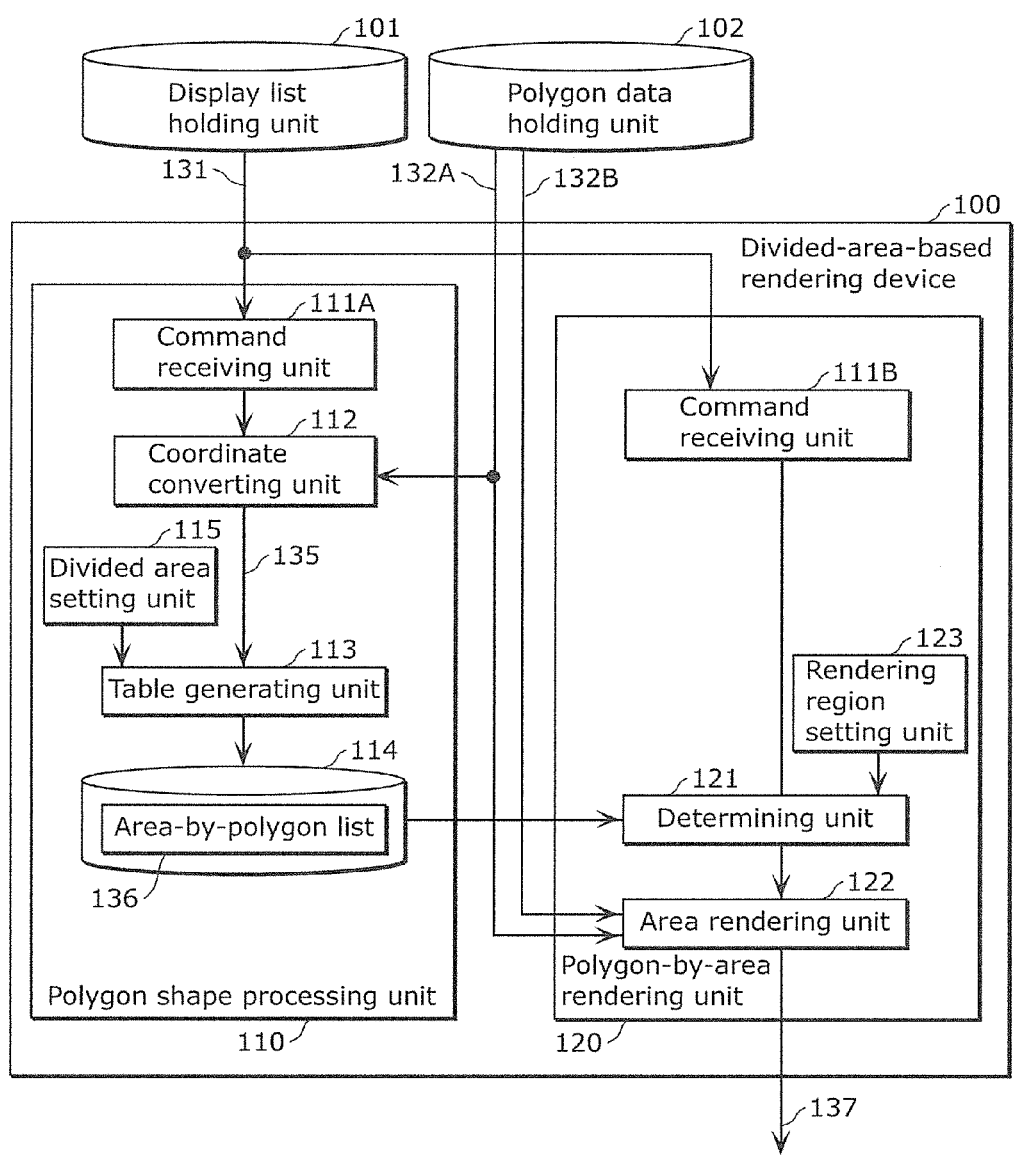
FIG. 3 is a block diagram illustrating a configuration of the divided-area-based rendering device according to Embodiment 1.

FIG. 3 is a block diagram illustrating a configuration of the divided-area-based rendering device 100 according to this embodiment.

The divided-area-based rendering device 100 shown in FIG. 3 includes a polygon shape processing unit 110 and a polygon-by-area rendering unit 120.

The polygon shape processing unit 110 generates an area-by-polygon table 136 that is a table in which divided areas are associated with polygons. The polygon-by-area rendering unit 120 performs rendering for each of the divided areas, using the area-by-polygon table 136.

The polygon shape processing unit 110 includes a command receiving unit 111A, a coordinate converting unit 112, a table generating unit 113, a table holding unit 114, and a divided area setting unit 115. The polygon-by-area rendering unit 120 includes a command receiving unit 111B, a determining unit 121, an area rendering unit 122, and a rendering region setting unit 123.

Figure 4A:
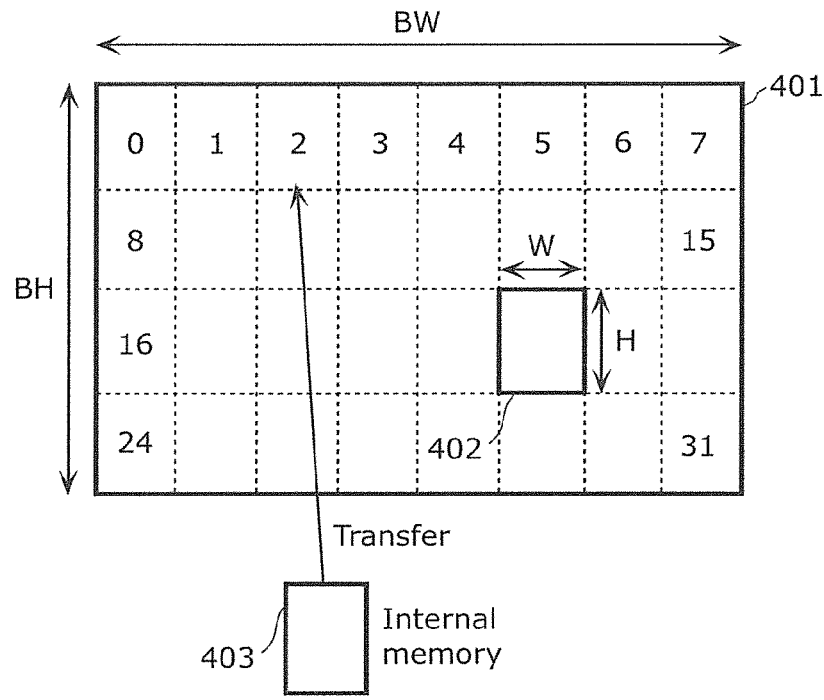
FIG. 4A is a diagram illustrating exemplary area division according to Embodiment 1.

The divided area setting unit 115 sets a size and a division number for rectangular divided areas. The procedure of divided-area-based rendering is described with reference to FIG. 4A and FIG. 4B. In the divided-area-based rendering, a final rendering region 401 is divided into divided areas 402 (0 to 31) smaller than the final rendering region 401. Then, rendering is performed for each of the divided areas 402. FIG. 4A shows a case where the final rendering region 401 is divided horizontally by eight and vertically by four, that is, by a total of 32.

Generally, an internal memory region 403 having the same size as data of each of the divided areas 402 is used as an area rendering destination. Thus, only the access to the internal memory region 403 is performed as access to pixel data in the rendering of each divided area. In other words, an external memory that holds data of the final rendering region 401 is not accessed. Moreover, every time the rendering of each divided area 402 is completed, the data of the processed divided area 402 is transferred as data of a position corresponding to the final rendering region 401 to the external memory. For this reason, the internal memory region 403 needs to have a size greater than or equal to a size large enough to include the data of the divided area 402.

Where a width and a height of the final rendering region 401 are respectively denoted by W and H, and a width and a height of the divided areas are respectively denoted by BW and BH, the number of the divided areas 402 horizontally arranged XNUM is calculated by CEIL (W/BW), and the number of the divided areas 402 vertically arranged YNUM is calculated by CEIL (H/BH).

FIG. 4A shows a division example in a state where W=8×BW and H=4×BH hold, where XNUM=8 and YNUM=4. In contrast, FIG. 4B shows a division example in the case of W=8×BW+α (α<BW) and H=4×BH+β (β<BH), where XNUM=9 and YNUM=5.

Figure 4B:
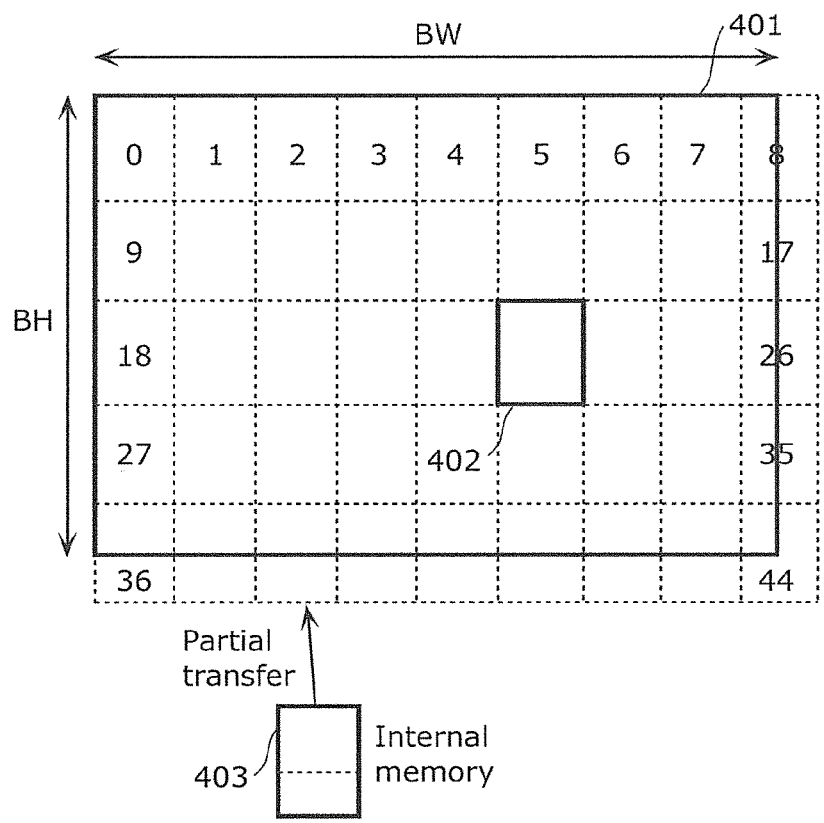
FIG. 4B is a diagram illustrating exemplary area division according to Embodiment 1.

If the width W of the final rendering region 401 cannot be divided by the width BW of the divided areas 402 as shown in FIG. 4B, the areas 8, 17, 26, 35, and 44 horizontally exceed the final rendering region 401 by BW−α, and the areas 36 to 44 vertically exceed the final rendering region 401 by BH−β. Consequently, transfer of portions of the areas in consideration of the fractions needs to be performed as transfer to the final rendering region 401.

It is to be noted that a method for setting a size and a division number of the divided areas 402, which is performed by the divided area setting unit 115, may be a given method. For instance, at least one of the size and the division number of the divided areas 402 may be predetermined. The divided area setting unit 115 outputs the set sizes (BW and BH) and division numbers (XNUM and YNUM) of the divided areas 402, to the table generating unit 113.

Figure 5:
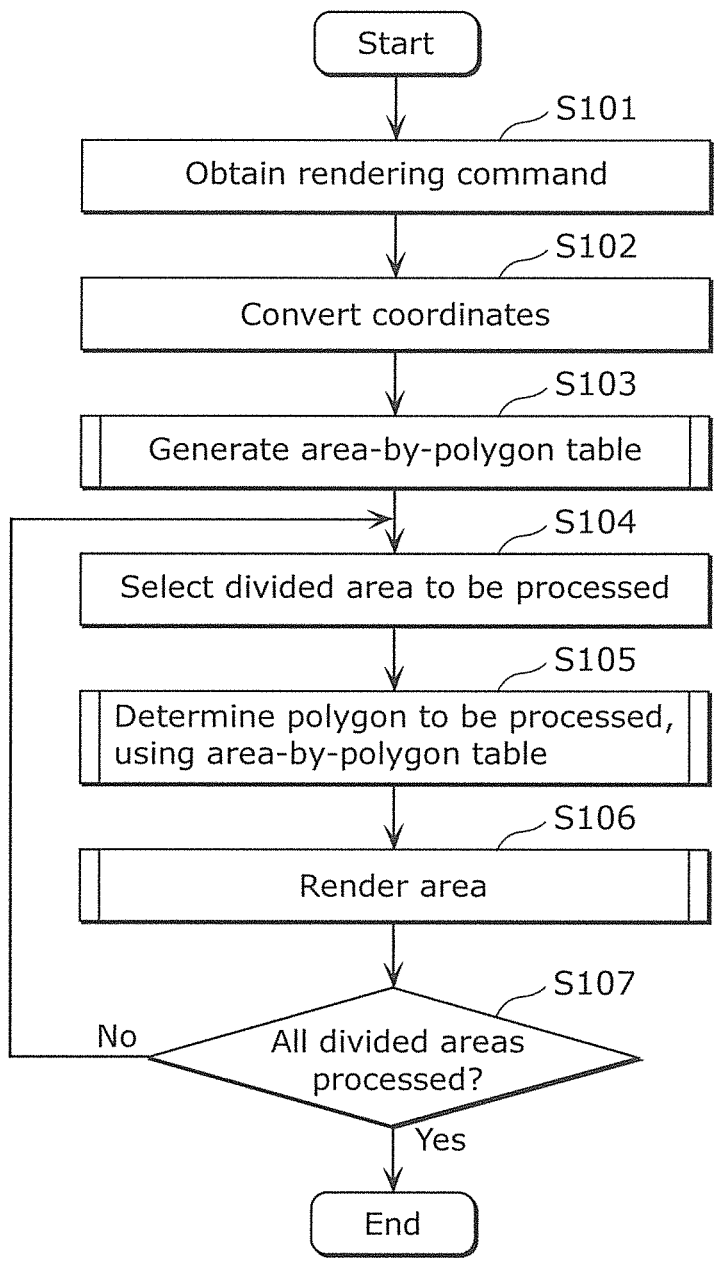
FIG. 5 is a flow chart for a divided-area-based rendering method according to Embodiment 1.

FIG. 5 is a flow chart for a divided-area-based rendering method performed by the divided-area-based rendering device 100.

The command receiving units 111A and 111B correspond to the command receiving unit 111 shown in FIG. 2. The display list holding unit 101 holds a display list including rendering commands 131. The polygon data holding unit 102 holds polygon data 132 of polygons.

First, the command receiving unit 111A receives a rendering command 131 included in the display list held in the display list holding unit 101, and interprets the rendering command 131 (S101). This rendering command 131 includes a pointer for polygon data 132.

Figure 6:
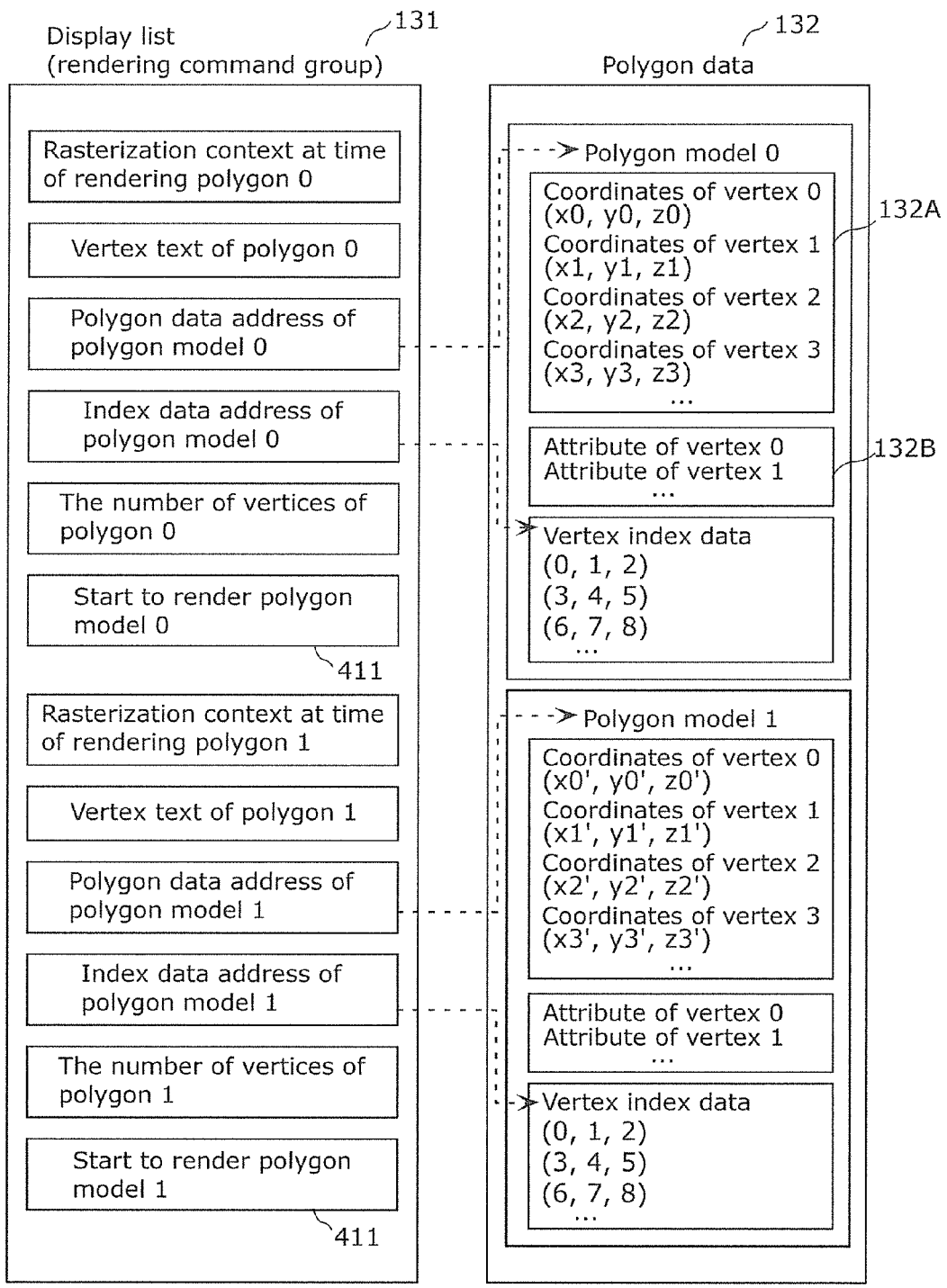
FIG. 6 is a diagram illustrating an exemplary display list and exemplary polygon data according to Embodiment 1.

Specifically, as shown in FIG. 6, the rendering command 131 includes (1) rendering context information necessary for rendering and displaying a polygon, (2) information indicating a polygon data address, (3) information indicating the number of vertices of a polygon, (4) information indicating a start of polygon rendering, and so on. Moreover, the display list that is a rendering command group includes address setting to the polygon data 132. As stated above, in a general configuration, the polygon data 132 is stored in a memory region different from a memory region of the display list.

The command receiving unit 111A fetches a rendering start command 411 indicating a start of polygon rendering and informs the coordinate converting unit 112 of the fetching.

Next, the coordinate converting unit 112 loads vertex coordinates 132A of each of polygons for which the rendering command 131 specifies the start of rendering, and converts the vertex coordinates 132A into screen coordinates 135 (S102). Specifically, the coordinate converting unit 112 refers to a polygon data address placed before the rendering start command 411, and loads the vertex coordinates 132A in the polygon data 132 stored at the address.

Here, the polygon data 132 includes, as vertex data, attribute data 132B (attribute data) along with the vertex coordinates 132A indicating positional coordinates in the three-dimensional space. The attribute data 132B includes information indicating a vertex color, a normal line, and texture coordinates. Moreover, the vertex coordinates 132A are normally represented by a position (x, y, z) in the three-dimensional space. The coordinate converting unit 112 converts the three-dimensional position into a two-dimensional position (X, Y) representing screen coordinates.

Figure 7A:
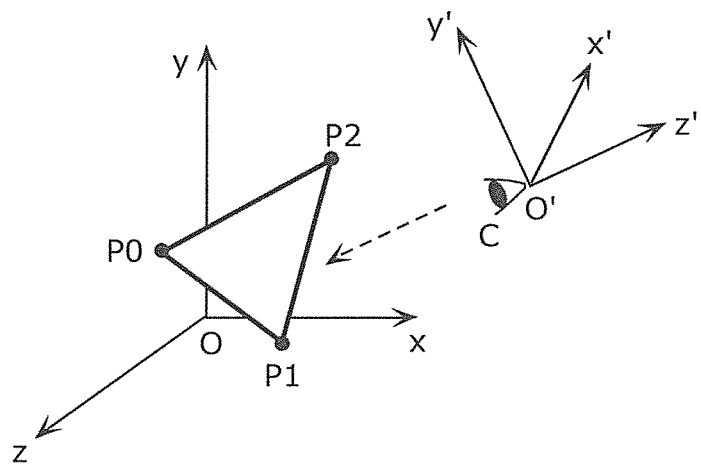
FIG. 7A is a diagram for describing coordinate conversion according to Embodiment 1.
Figure 7B:
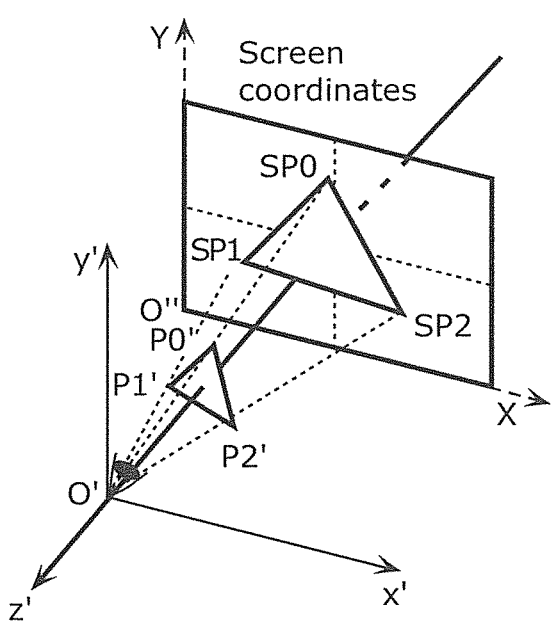
FIG. 7B is a diagram for describing coordinate conversion according to Embodiment 1.

The coordinate conversion is a known technique in general 3D graphics, but the following describes a summary of the coordinate conversion with reference to FIG. 7A and FIG. 7B.

A polygon triangle P0, P1, P2 at vertex coordinates 132A is represented by a model coordinate system (x, y, z) that is positional coordinates in the three-dimensional space. The coordinate converting unit 112 converts the points P0, P1, and P2 indicated by the vertex coordinates 132A into points P0', P1', and P2' in a camera coordinate system (x', y', z') having a viewpoint position C in the three-dimensional space as the origin and an eye direction of −z'. Moreover, the coordinate converting unit 112 performs projective transformation in which the points P0', P1', and P2' are projected onto a screen, to compute points SP0, SP1, and SP2 (screen coordinates 135) in a screen coordinate system (X, Y).

The screen coordinates 135 indicate at which position in a final rendering region a polygon is. Thus, the screen coordinates 135 can be used to determine which divided area the polygon belongs to. The coordinate converting unit 112 transmits, to the table generating unit 113, the screen coordinates 135 of the vertices of the polygon.

Furthermore, the coordinate converting unit 112 performs only the culling determination but not culling itself. When all the vertices of the polygon are out of the final rendering region, the polygon is not rasterized finally and becomes unnecessary. The culling is processing for deleting this unnecessary polygon itself at a coordinate conversion stage. It is to be noted that the deletion of a polygon means excluding a polygon from a rendering target.

The culling determination is processing for only determining whether all vertices of a polygon are out of a final rendering region. In other words, the coordinate converting unit 112 determines, for each polygon, whether the polygon is a valid polygon at least part of which is displayed in a rendering region or an invalid polygon the whole of which is not displayed in the rendering region, using the screen coordinates 135.

Moreover, the coordinate converting unit 112 adds an invalid flag to a polygon to be culled, and transmits the invalid flag together with the screen coordinates 135 of the polygon, to the table generating unit 113.

Furthermore, the coordinate converting unit 112 may perform clipping other than the above processing. The clipping is well-known processing for setting, when some of vertices of a polygon are (1) behind a viewpoint position C or (2) out of a final rendering region, the polygon within a region in the field of view by cutting part of the polygon out of the final rendering region.

Figure 8A:
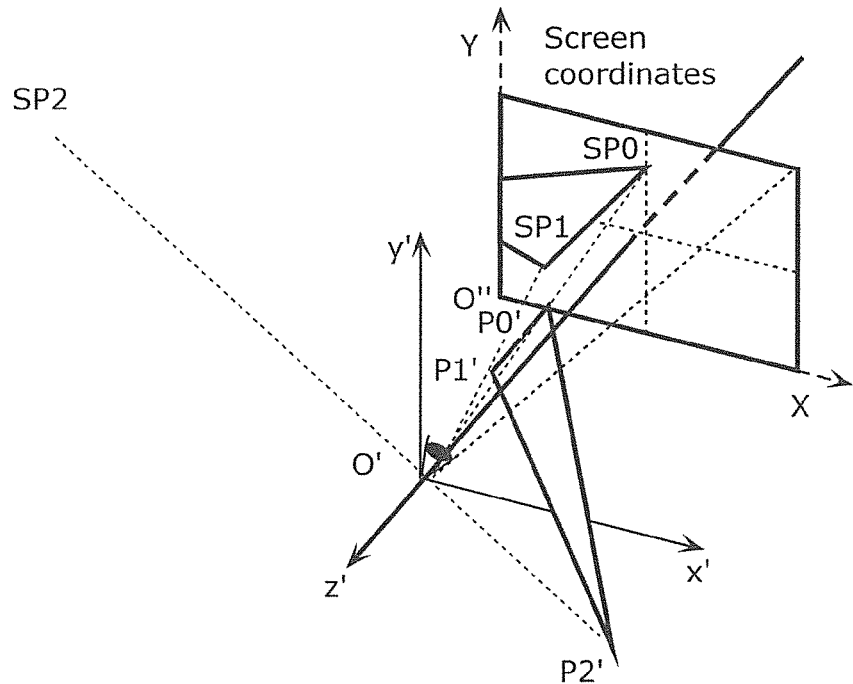
FIG. 8A is a diagram for describing clipping according to Embodiment 1.
Figure 8B:
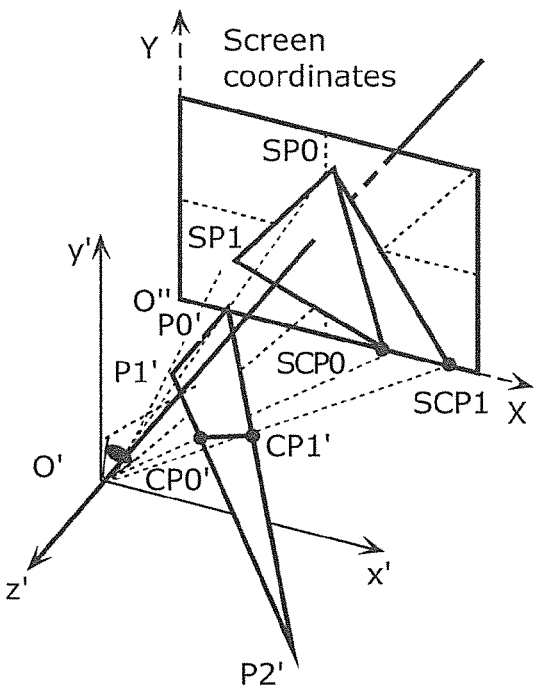
FIG. 8B is a diagram for describing clipping according to Embodiment 1.

The following describes the clipping. FIG. 8A and FIG. 8B each are a diagram illustrating the clipping. When a vertex P2' in the camera coordinate system is behind a viewpoint position (has a negative Z' coordinate), coordinates SP2 resulting from simple application of projective transformation cannot be converted into accurate screen coordinates 135 as shown in FIG. 8A. In view of this, as shown in FIG. 8B, the coordinate converting unit 112 clips sides of a polygon at a Z' coordinate ahead of the viewpoint position before the projective transformation. This enables the conversion into the accurate screen coordinates.

In this example, the coordinate converting unit 112 calculates a side P1'P2' and a side P0'P2' connected to the vertex P2' having the negative Z' coordinate, and intersection points CP0' and CP1 on Z'=N (N>0) plane. Next, the coordinate converting unit 112 applies the projective transformation to CP0' and CP1' to derive screen coordinates SCP0 and SCP1. In this manner, the coordinate converting unit 112 generates a polygon SP0, SP1, SCP0 and a polygon SP0, SCP0, SCP1. To put it differently, the coordinate converting unit 112 divides the polygon into divided polygons by performing the clipping using the screen coordinates 135.

When one polygon is divided into polygons through the clipping, the coordinate converting unit 112 adds, to the divided polygons, a clipping-state flag indicating that the polygons have been generated from the same polygon. Then, the coordinate converting unit 112 transmits a set of the screen coordinates 135 of the polygons obtained by dividing the one polygon along with the clipping-state flag, to the table generating unit 113.

It is to be noted that when all vertices of the polygons are out of the final rendering region as the result of the clipping division, as with the time of the culling determination, the coordinate converting unit 112 transmits the screen coordinates 135 of the polygons along with the invalid flag to the table generating unit 113 without deleting the polygons.

Moreover, as stated above, the polygon data 132 includes not only the vertex coordinates 132A but also the attribute data 132B such as texture reference coordinates, a vertex color, and a vertex normal vector. The coordinate converting unit 112 may load only the vertex coordinates 132A which are necessary for calculating the screen coordinates and are in the polygon data 132, or may load the vertex coordinates 132A with the attribute data 132B that are grouped. When, however, the vertex coordinates 132A are loaded with the attribute data 132B, a time required for loading and an amount of memory access increase accordingly. Moreover, the coordinate conversion itself may be achieved with a program such as a µ code or may be hard-wired.

Next, the table generating unit 113 calculates, using the screen coordinates 135 for each polygon and the number and size of the divided areas, area information of the polygon to generate the area-by-polygon table 136 that is a table in which the area information items are associated with the respective polygons (S103). The area information is information indicating a divided area to which a polygon belongs. For example, the area information is information indicating a boundary box. The boundary box is the smallest rectangle including a whole polygon. It is to be noted that the area information may be information indicating a first area including a polygon or information indicating something other than the boundary box. Moreover, the area information is, for instance, information indicating a divided area including at least part of the first area.

Hereinafter, this processing is described with reference to FIG. 9.

When the final rendering region 401 is divided horizontally into eight divided areas and vertically into four divided areas, the 32 divided areas are present which have area IDs ranging from 0 to 31. In FIG. 9, three vertices 422A to 422C representing a polygon 421 belong to the respective divided areas having the area IDs 3, 25, and 21. A boundary box 423 of the polygon 421 is the smallest rectangle including the vertices 422A to 422C. Moreover, among the four vertices representing the boundary box 423, the vertex 424 and the vertex 425 that are diagonal to each other are in the divided areas having the area IDs 1 and 29. The table generating unit 113 stores, as area information, the two area IDs including the vertex 424 and the vertex 425 into the area-by-polygon table 136.

Figure 9:
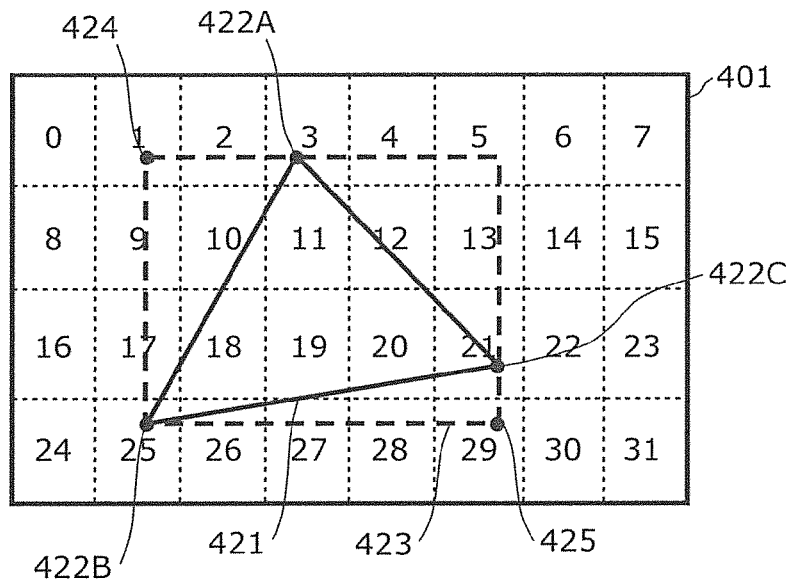
FIG. 9 is a diagram for describing area-by-polygon table generation processing according to Embodiment 1.
Figure 10:
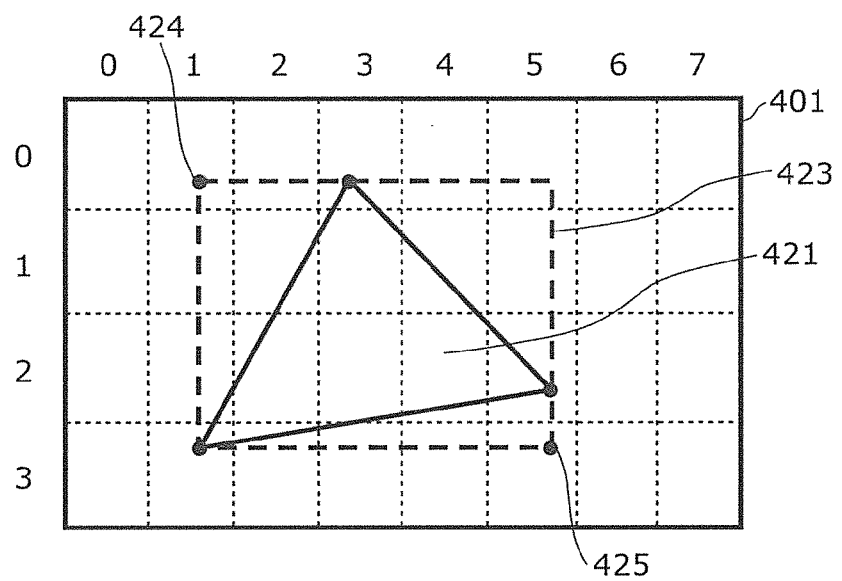
FIG. 10 is a diagram for describing area-by-polygon table generation processing according to Embodiment 1.

It is to be noted that although FIG. 9 illustrates the example where the area IDs are managed one-dimensionally, as shown in FIG. 10, the boundary box 423 may be managed with two-dimensional area IDs in a horizontal direction and a vertical direction. In FIG. 10, the boundary box 423 is represented as (XID, YID)=(1, 0), (5, 3).

Figures 11A, 11B:
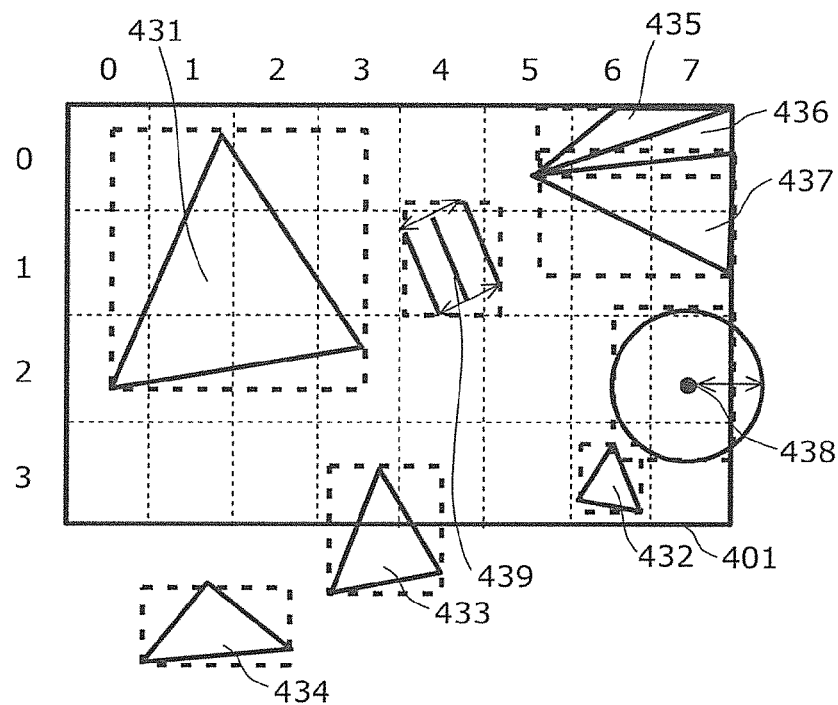
FIG. 11A is a diagram illustrating exemplary polygons according to Embodiment 1.
FIG. 11B is a diagram for describing a method for calculating area information according to Embodiment 1.

The following describes a method for calculating area information for various polygon patterns with reference to FIG. 11A and FIG. 11B.

All vertices of a polygon 431 are within a final rendering region 401. In this case, area information is represented by a set of (0, 0) and (3, 2) that are the minimum area ID and the maximum area ID, respectively, of a rectangular area including the polygon 431.

All vertices of a polygon 432 belong to the same divided area. In this case, area information is represented by a set of (6, 3) and (6, 3) that are the minimum area ID and the maximum area ID, respectively, of a rectangular area including the polygon 432.

Some of vertices of a polygon 433 are out of the final rendering region 401. In this case, area information is represented by a set of (3, 3) and (4, 3) that are the minimum area ID and the maximum area ID, respectively, included in the final rendering region 401.

All of vertices of a polygon 434 are out of the final rendering region 401. In this case, an invalid flag indicating that the polygon 434 is not to be rendered is added to the polygon 434. When an invalid flag is added to a polygon to be processed (i.e. the polygon to be processed is an invalid polygon), the table generating unit 113 stores, into an entry included in the area-by-polygon table 136, area information indicating that the polygon to be processed is the invalid polygon. Specifically, the table generating unit 113 sets the maximum area ID value (7, 3) of a divided area to the minimum area ID of the area information of the polygon to which the invalid flag is added, and the minimum area ID value (0, 0) of the divided area to the maximum area ID. In other words, the table generating unit 113 sets, as the area information of the invalid polygon, information indicating that the polygon belongs to none of the divided areas.

Polygons 435 to 437 each are a divided polygon obtained by dividing one polygon through the clipping. In this case, area information indicates the union of boundary boxes of the divided polygons.

Specifically, in the example shown in FIG. 11A, the boundary box of the polygon 435 is represented by (5, 0) and (7, 0), the boundary box of the polygon 436 is represented by (5, 0) and (7, 0), and the boundary box of the polygon 437 is represented by (5, 0) and (7, 1). Thus, the boundary box for the polygons before the clipping division is represented by (5, 0) and (7, 1).

A polygon 438 is not a triangle but a point primitive having one vertex. A polygon 439 is a line primitive having two vertices. As with a triangle primitive, a rectangle enclosing a polygon may be calculated for the point primitive and the line primitive. However, in the OpenGL ES specification that is standard application programming interface (API) specification for 3D graphics, an API for changing a size of a point and an API for changing a width of a line exist for rendering point primitives and line primitives. For this reason, a boundary box cannot be calculated with only the vertex coordinates, and it is necessary to calculate a boundary box in consideration of a context such as the size of the point and the width of the line set by the APIs. For example, as shown in FIG. 11A, it is necessary to set, for area information of a point having a radius, a set of (6, 1) and (7, 3) representing a boundary box in consideration of the radius. Moreover, it is necessary to set, for area information of a line having a line width, a set of (4, 0) and (5, 1) representing a boundary box in consideration of the line width.

It is, however, not necessary to strictly calculate the area information, and as long as it is guaranteed that a true area is included, a simplified boundary box may be set as area information to reduce an amount of calculation.

For instance, for the polygon 438 that is the point primitive, the table generating unit 113 does not calculate a boundary box from a circle, but may use, as four vertices of the boundary box, four points obtained by adding or subtracting the radius of the circle to or from vertex coordinates 132A that are the center of the circle.

Moreover, for the polygon 439 that is the line primitive, the table generating unit 113 does not calculate a rectangle with rotation as shown in FIG. 11A, but may calculate a total of eight points obtained by adding or subtracting a line width to or from each of two vertex coordinates representing lines, and calculate a boundary box using the eight points.

Figure 12:
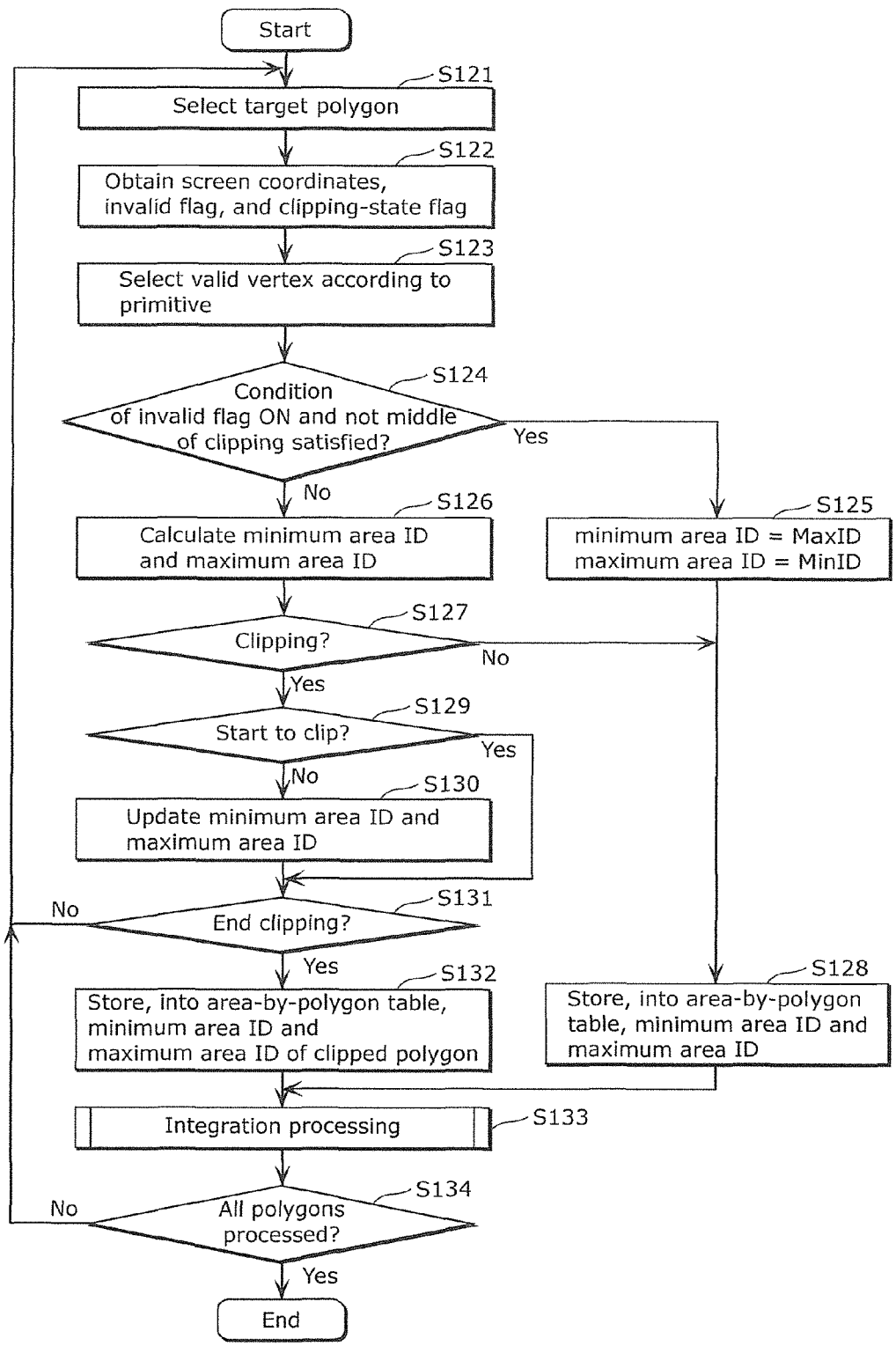
FIG. 12 is a flow chart illustrating operations in area-by-polygon table generation processing according to Embodiment 1.

FIG. 12 is a flow chart illustrating processing for generation of the area-by-polygon table 136 (S103 in FIG. 5) performed by the table generating unit 113. In FIG. 12, however, the radius and the line width in the point primitive and the line primitive are not considered.

First, the table generating unit 113 selects, as a target polygon, one of polygons to be rendered (S121). The table generating unit 113 sequentially selects, according to an order in which information items about the polygons are arranged in the rendering command 131, a polygon starting from the polygon arranged first.

Next, the table generating unit 113 obtains, from the coordinate converting unit 112, screen coordinates 135, an invalid flag, and a clipping-state flag of the target polygon (S122).

Next, the table generating unit 113 selects a valid vertex according to a primitive of the polygon (S123). Specifically, when the polygon is a point primitive, since only the one vertex has valid screen coordinates, screen coordinates of other two vertices are not referred to in the subsequent calculation of a boundary box. Likewise, when the polygon is a line primitive, two vertices are selected as valid screen coordinates, and when the polygon is a triangle primitive, three vertices are selected as valid screen coordinates.

Next, the table generating unit 113 determines, by referring to the invalid flag, whether the target polygon is a valid polygon or an invalid polygon. Moreover, the table generating unit 113 determines, by referring to the clipping-state flag, whether the target polygon is a divided polygon obtained through clipping (S124).

When a condition that the target polygon is the invalid polygon and is not the divided polygon is satisfied (Yes in S124), the table generating unit 113 sets the maximum area ID (MaxID) of the divided areas as the minimum area ID of area information, and sets the minimum area ID (MinID) of the divided areas as the maximum area ID of the area information (S125). With this, the area information indicates nonexistent areas. In other words, the area information indicates that the polygon belongs to none of the divided areas. It is to be noted that the same effect can be produced by setting area information that satisfies the minimum area ID>the maximum area ID.

Next, the table generating unit 113 stores the set area information (the minimum area ID and the maximum area ID) into one entry included in the area-by-polygon table 136 (S128).

As stated above, when the target polygon is the invalid polygon, the table generating unit 113 stores, into the entry, the area information indicating that the target polygon is the invalid polygon. Moreover, when the area information indicates that the target polygon is the invalid polygon in the area-by-polygon table 136, the determining unit 121 excludes the target polygon from a rendering target.

In contrast, when the target polygon is the valid polygon or the divided polygon (No in S124), the table generating unit 113 calculates the minimum coordinates and the maximum coordinates of a rectangle enclosing the target polygon. Specifically, when the target polygon is not the divided polygon, the table generating unit 113 calculates, using screen coordinates 135 of a valid vertex, the minimum coordinates and the maximum coordinates of the rectangle enclosing the target polygon. Then, the table generating unit 113 calculates, using the number and a size of the divided areas, an area ID of a divided area having the calculated minimum coordinates and an area ID of a divided area having the calculated maximum coordinates. Then, the table generating unit 113 sets the area ID of the divided area having the minimum coordinates to the minimum area ID, and the area ID of the divided area having the maximum coordinates to the maximum area ID (S126). It is to be noted that when the minimum coordinates or the maximum coordinates are out of the final rendering region 401, the table generating unit 113 corrects the minimum coordinates or the maximum coordinates to coordinates of a position, in the final rendering region 401, closest to the minimum coordinates or the maximum coordinates.

Furthermore, when the target polygon is the divided polygon, the table generating unit 113 sets an area ID indicating invalidity as area information (the maximum area ID and the minimum area ID).

Next, the table generating unit 113 determines, by referring to the clipping-state flag, whether the target polygon is a divided polygon obtained through clipping (S127).

When the target polygon is not the divided polygon (No in S127), the table generating unit 113 stores the minimum area ID and the maximum area ID calculated in step S126 into one entry included in the area-by-polygon table 136 (S128).

In contrast, when the target polygon is the divided polygon (Yes in S127), the table generating unit 113 determines whether the target polygon is a divided polygon at the start of clipping (S129). When the target polygon is the divided polygon at the start of clipping (Yes in S129), the minimum area ID and the maximum area ID of the target polygon are directly held as an initial value.

In contrast, if the target polygon is a divided polygon in the middle of clipping except for the start of clipping (No in S129), the table generating unit 113 updates the minimum area ID and the maximum area ID of a preceding divided polygon (e.g. the divided polygon at the start of clipping), using the minimum area ID and the maximum area ID of the polygon to be processed (S130). This processing corresponds to calculating the union of a boundary box of the preceding divided polygon and a boundary box of the polygon to be processed. Specifically, the table generating unit 113 selects a smaller one of the minimum area ID of the preceding divided polygon and the minimum area ID of the polygon to be processed, and sets the selected minimum area ID to the updated minimum area ID. Moreover, the table generating unit 113 selects a larger one of the maximum area ID of the preceding divided polygon and the maximum area ID of the polygon to be processed, and sets the selected maximum area ID to the updated maximum area ID.

Next, the table generating unit 113 determines whether the target polygon is a divided polygon at the end of clipping (S131). When the target polygon is not the divided polygon at the end of clipping (No in S131), the table generating unit 113 still needs to refer to other divided polygons included in a polygon before division. Thus, the table generating unit 113 selects the next polygon as the target polygon (S121), and performs step S122 and the subsequent processing.

In contrast, when the target polygon is the divided polygon at the end of clipping (Yes in S131), a set of the minimum area ID and the maximum area ID held at the time indicates a boundary box of one polygon before division. Thus, the table generating unit 113 stores the minimum area ID and the maximum area ID into one entry included in the area-by-polygon table 136 (S132).

As stated above, when the clipping is performed on the target polygon, the table generating unit 113 calculates the first area including all the divided polygons, and stores the area information indicating the divided area including at least part of the calculated first area, into one of entries.

After step S128 or step S132, the table generating unit 113 performs integration processing (S133). It is to be noted that this integration processing is described later.

When the above processing is not performed on all the polygons to be rendered (No in S134), the next polygon is selected (S121), and step S122 and the subsequent processing are performed on the selected polygon.

Hereinafter, the integration processing (S133) is described.

Figures 13A, 13B:
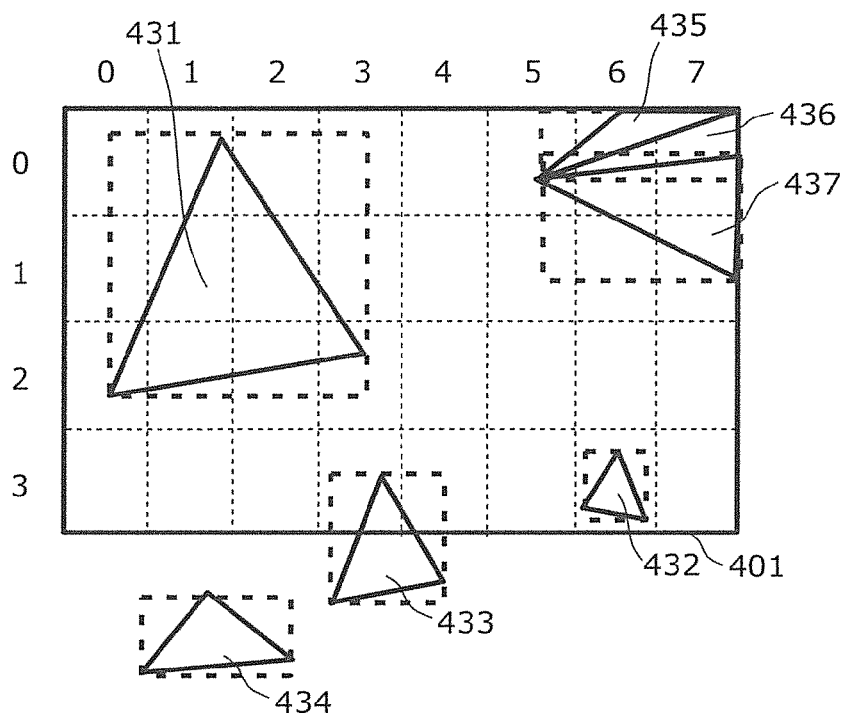
FIG. 13A is a diagram illustrating exemplary polygons according to Embodiment 1.
FIG. 13B is a diagram illustrating an exemplary area-by-polygon table according to Embodiment 1.

FIG. 13A is a diagram illustrating exemplary polygons to be rendered. FIG. 13B illustrates the area-by-polygon table 136 in such a case.

The area information thus calculated is registered in the area-by-polygon table 136. Here, the area-by-polygon table 136 is a table having a fixed number (TMAX) of entries. When the number of original polygons is less than or equal to TMAX, area information about one original polygon is held per entry as shown in FIG. 13B. In contrast, when the number of the polygons is greater than TMAX, area information items about polygons need to be held per entry.

Figures 14, 15A:
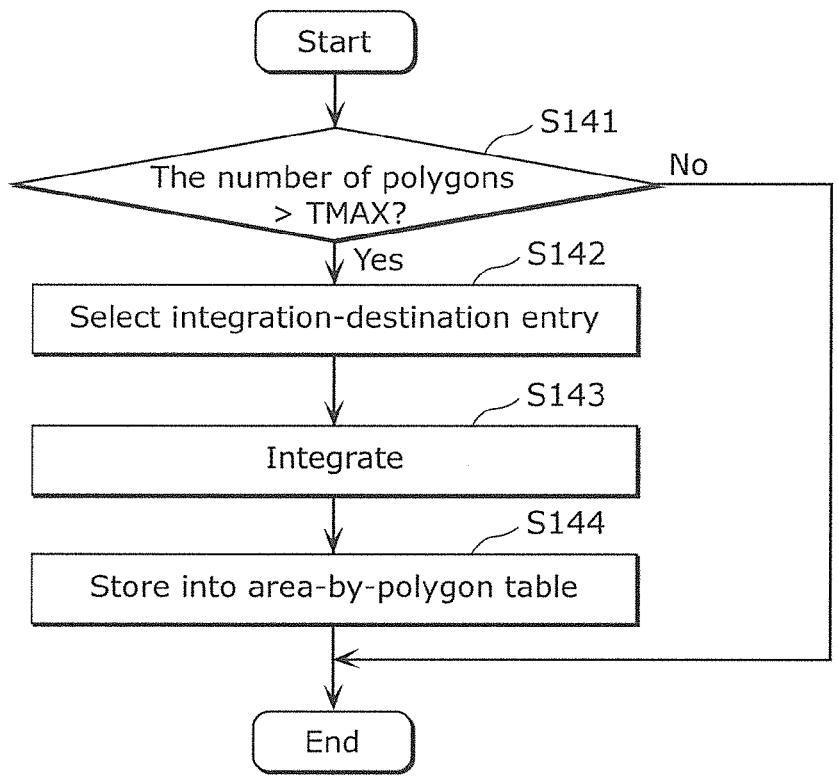
FIG. 14 is a flow chart illustrating operations in integration processing according to Embodiment 1.
FIG. 15A is a diagram illustrating an area-by-polygon table at time of integration processing according to Embodiment 1.
Figures 15B, 15C, 16A:
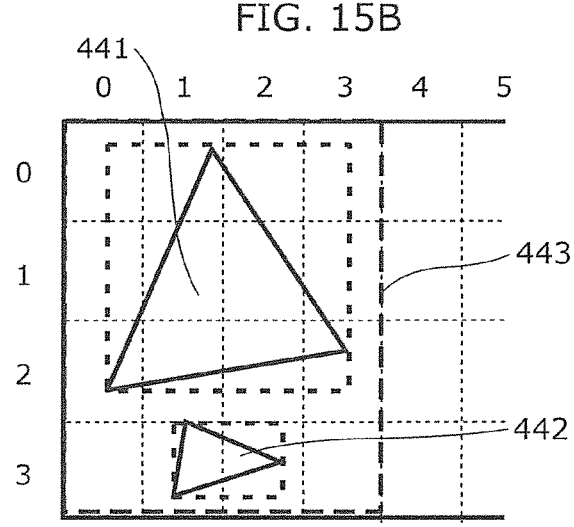
FIG. 15B is a diagram for describing integration processing according to Embodiment 1.
FIG. 15C is a diagram illustrating an area-by-polygon table at time of integration processing according to Embodiment 1.
FIG. 16A is a diagram illustrating an area-by-polygon table at time of integration processing according to Embodiment 1.

FIG. 14 is a flow chart for the integration processing (S133). FIG. 15A to FIG. 15C are diagrams for describing the integration processing. It is to be noted that hereinafter, for simplicity of description, a case is described where TMAX=8, and polygon numbers are assigned to polygons in ascending order of input of the polygons, e.g. Polygon 0, Polygon 1, . . . .

First, the table generating unit 113 determines whether the number of polygons is greater than TMAX (S141).

When the number of the polygons is less than or equal to TMAX (No in S141), the table generating unit 113 does not perform the integration processing, but stores area information about one polygon per entry in ascending order starting from Entry 0 (FIG. 15A).

In contrast, when the number of the polygons is greater than TMAX (Yes in S141), the table generating unit 113 performs the integration processing. For instance, when Polygon 8 is input, since the number of the polygons exceeds the number of entries, area information about one polygon cannot be held per entry. Then, the table generating unit 113 selects an integration-destination entry (S142). For example, the table generating unit 113 selects Entry 0 having the smallest entry number and the least number of registered polygons that is the number of the polygons corresponding to the area information items.

Next, the table generating unit 113 integrates a boundary box indicated in the area information held in the selected entry and a boundary box of a target polygon (S143). Specifically, the table generating unit 113 reads the area information of Polygon 0 (a polygon 441) held in Entry 0, and computes a boundary box 443 that is the union of a boundary box of Polygon 0 and a boundary box of Polygon 8 (a polygon 442) to be processed.

Next, the table generating unit 113 stores again, as area information after integration, area information indicating the computed boundary box 443 into Entry 0 (S144).

Furthermore, when Polygon 9 is registered, the table generating unit 113 selects Entry 1 of which the number of registered polygons is one (S142), and reads area information about registered Polygon 1. Then, the table generating unit 113 calculates the union of a boundary box of Polygon 9 and a boundary box of Polygon 1 (S143), and stores again area information that indicates the integrated boundary box and results from the calculation, into Entry 1 (S144).

In other words, when a target polygon N is registered, the table generating unit 113 calculates the union of a boundary box indicated in area information held in an entry (N % TMAX) and a boundary box of the polygon N, and stores again area information that indicates the integrated boundary box and results from the calculation, into the entry (N % TMAX). With this, it is possible to hold a lot of area information items about polygons in the area-by-polygon table 136 having a predetermined fixed capacity.

As stated above, when the number of the polygons is greater than the fixed number TMAX, the table generating unit 113 divides the polygons into the TMAX number of groups each including at least one polygon. Then, the table generating unit 113 calculates, for each of the TMAX number of the groups, a second area including polygons in the two-dimensional plane which are included in the group, using the screen coordinates. Next, the table generating unit 113 determines, from among the divided areas, a divided area including at least part of the second area. Next, the table generating unit 113 generates the area-by-polygon table 136 that is a table in which, for each group, the divided area including the at least part of the second area is associated with the group. In this case, the determining unit 121 determines, for each divided area, a rendering polygon that is, among the polygons, a polygon included in a group with which a divided area to be processed is associated in the area-by-polygon table 136.

More specifically, the table generating unit 113 sequentially selects one of the polygons as a target polygon. Then, the table generating unit 113 generates, for each of the selected target polygons, area information about the target polygon, and stores the area information into, among the entries, an entry holding no area information. Moreover, when storing area information about a new polygon, the table generating unit 113 determines whether the number of area information items stored in the area-by-polygon table 136 is greater than the fixed number TMAX as the result of storing the area information. When the number of the area information items is greater than the fixed number TMAX, the table generating unit 113 calculates, using area information stored in a selected entry that is one of the entries and the area information about the new polygon, the second area including a new polygon and a polygon that corresponds to the area information stored in the selected entry. Next, the table generating unit 113 stores area information indicating a divided area including at least part of the calculated second area, into the selected entry.

It is to be noted that although the case is described where the polygon numbers are assigned to the polygons in ascending order of input of the polygons, e.g. Polygon 0, Polygon 1, . . . , a unique identification number N independent of an input order may be assigned to each polygon. In this case, the following processing is performed.

First, the table generating unit 113 determines whether an identification number N of a target polygon is greater than TMAX. When the identification number N is less than or equal to TMAX, the table generating unit 113 does not perform the integration processing, but stores area information about one polygon per entry. For instance, the table generating unit 113 stores area information about the target polygon into an entry having an entry number that is the same as the identification number N.

In contrast, when the identification number N is greater than TMAX, the table generating unit 113 performs the integration processing. For example, the table generating unit 113 calculates the union of a boundary box indicated in area information held in an entry (N % TMAX) and a boundary box of the polygon having the identification number N, and stores again area information that indicates the integrated boundary box and results from the calculation, into the entry (N % TMAX).

With this, it is possible to hold a lot of area information items about polygons in the area-by-polygon table 136 having a predetermined fixed capacity.

It is to be noted that a method for selecting a storage entry for area information in the integration processing is not limited to the above.

It is also to be noted that in the integration processing the table generating unit 113 may store area information items about polygons consecutive in input order. Hereinafter, operations in this case are described.

In the integration processing there is a case where area information items about polygons independent of one another are integrated. This is likely to reduce the accuracy of integrated area information. On the other hand, the table generating unit 113 is capable of integrating the area information items about the polygons consecutive in input order, that is, area information items about polygons of which the display positions are relatively close to each other. This makes it possible to suppress the reduction in accuracy of the integrated area information.

Specifically, when the number of polygons is greater than TMAX, the table generating unit 113 performs the integration processing such that regarding the exceeding number of the polygons, area information items about two consecutive polygons are held in one entry. Moreover, when the number of original polygons is greater than TMAX×2, the table generating unit 113 performs the integration processing such that regarding the exceeding number of the original polygons, area information items about four consecutive polygons are held in one entry. Furthermore, when the number of polygons is greater than TMAX×$2^N$, the table generating unit 113 performs the integration processing such that regarding the exceeding number of the polygons, area information items about $2^{(N+1)}$ consecutive polygons are held in one entry.

FIG. 16A to FIG. 16D and FIG. 17A to FIG. 17F are diagrams for describing the integration processing. It is to be noted that hereinafter, for simplicity of description, a case is described where TMAX=8, and polygon numbers are assigned to polygons in ascending order of input of the polygons, e.g. Polygon 0, Polygon 1, . . . . Moreover, when the number of the polygons is less than or equal to TMAX, area information about one polygon is stored per entry in ascending order starting from Entry 0.

FIG. 16A illustrates the area-by-polygon table 136 when the number of the polygons is eight. When a polygon is input in a state shown in FIG. 16A, the number of the polygons increases to nine, and the number of the polygons is greater than the number of entries. In view of this, as shown in FIG. 16B, the table generating unit 113 reads a boundary box ((0, 0) and (3, 2)) of Polygon 0 (a polygon 451: a polygon that is input first) and a boundary box ((4, 0) and (4, 0)) of Polygon 1 (a polygon 452: a polygon that is input second), from the area-by-polygon table 136, and calculates a boundary box 453 ((0, 0) and (4, 2)) that is the union of the two boundary boxes. Then, the table generating unit 113 stores, as merge area information, area information indicating the calculated boundary box 453 into Entry 0.

Next, as shown in FIG. 16C, the table generating unit 113 calculates a boundary box 456 ((0, 0) and (1, 2)) that is the union of a boundary box ((0, 0) and (1, 1)) of newly input Polygon 8 (a polygon 454) and a boundary box ((0, 1) and (1, 2)) of Polygon 9 (a polygon 455) that is input next, and stores, as new area information, area information indicating the boundary box 456 into Entry 1. With this, the area-by-polygon table 136 shown in FIG. 16D is generated.

In other words, when the number of the polygons exceeds the number of the entries, the table generating unit 113 merges the content of the registered two entries into one entry, calculates the union of area information items about newly input polygons the number of which is the same as the number of mergences that is the number of merged polygons, and stores the union into an empty entry. With this, even if the number of the polygons is greater than the number of the entries, it is possible to hold every area information item.

Furthermore, when Polygon 10 is registered in a state shown in FIG. 16D, since the area information items about the two polygons that are as many as the number of the mergences are already held in Entry 1, the table generating unit 113 selects Entry 2 and Entry 3 as the next entries to be merged. To put it another way, the table generating unit 113 selects two entries having the least number of mergences as entries to be merged. Then, the table generating unit 113 merges area information items of the selected two entries, and stores the merged area information into Entry 2 and area information about new Polygon 10 into Entry 3.

Moreover, when Polygon 11 is registered, since only the area information about the one polygon is registered in Entry 3, the table generating unit 113 calculates the union of a boundary box of Polygon 10 and a boundary box of Polygon 11, and stores the calculation result into Entry 3.

Furthermore, when Polygon 12 is registered, since the area information items about the two polygons that are as many as the number of the mergences are held in Entry 3, the table generating unit 113 selects Entry 4 and Entry 5 as the next entries to be merged. Then, the table generating unit 113 merges area information items of the selected two entries, and stores the merged area information into Entry 4 and area information about new Polygon 12 into Entry 5.

Repeatedly performing the above processing results in storing area information about two polygons in each of all the entries as shown in FIG. 17A. When Polygon 16 is further registered in this state, the table generating unit 113 reads boundary boxes of Entry 0 and Entry 2 and merges the two read boundary boxes. Then, the table generating unit 113 stores the merged area information about four Polygons 0 to 3 into Entry 0, and area information about Polygon 16 into Entry 2 (FIG. 17B). From this state, the table generating unit 113 is capable of storing merged area information about four new Polygons 16 to 19 into Entry 2.

When new Polygons 20 to 23 are registered, the table generating unit 113 merges area information items of Entry 4 and Entry 6 to generate merged area information about four Polygons 4 to 7, and stores the merged area information into Entry 4, and area information items about new Polygons 20 to 23 into Entry 6 (FIG. 17C). When the number of the polygons reaches 24, the merged area information about the four polygons is held in the entry having the entry number of 2×k (k=0, 1, 2, 3), and the merged area information about the two polygons is held in the entry having the entry number of 2×k+1.

When Polygon 24 is further registered, the table generating unit 113 selects, as an entry to be merged, the entry (2×k+1) that holds not the merged area information about the four polygons but the merged area information about the two polygons. Stated differently, the table generating unit 113 merges the area information items of Entry 1 and Entry 3 to generate merged area information about four Polygons 4 to 7, and stores the merged area information into Entry 1, and area information about Polygon 24 into Entry 3 (FIG. 17D). From this state, the table generating unit 113 is capable of storing merged area information about four Polygons 24 to 27 into Entry 3.

When new Polygons 28 to 31 are registered, the table generating unit 113 merges area information items of Entry 5 and Entry 7 to generate merged area information about four Polygons 12 to 15, and stores the merged area information into Entry 5, and area information items about new Polygons 28 to 31 into Entry 7 (FIG. 17E). In a state shown in FIG. 17E, the area information items about the four polygons are stored in each of all the entries.

When Polygon 32 is further registered in this state, the table generating unit 113 merges the area information items of Entry 0 and Entry 4 to generate merged area information about eight Polygons 0 to 7, and stores the merged area information into Entry 0, and area information about Polygon 32 into Entry 4 (FIG. 17F).

As stated above, when storing area information about a new polygon, the table generating unit 113 determines whether the number of area information items stored in the area-by-polygon table 136 is greater than the fixed number TMAX as the result of storing the area information. When the number of the area information items is greater than the fixed number TMAX, the table generating unit 113 calculates, using two area information items stored in a first entry and a second entry among entries, a second area including a polygon corresponding to the area information stored in the first entry and a polygon corresponding to the area information stored in the second entry. Next, the table generating unit 113 stores area information indicating a divided area including at least part of the calculated second area into the first entry, and the area information about the new polygon into the second entry.

As just described, the table generating unit 113 performs the integration processing so that the results of the merging are arranged in the order of input of the polygons. With this, the table generating unit 113 is capable of making the best use of the locality of the polygons and thereby generating the area-by-polygon table 136 for which a reduction in accuracy is suppressed. The determining unit 121 uses the area-by-polygon table 136.

The divided-area-based rendering method is described once again with reference to FIG. 3 and FIG. 5.

After the area-by-polygon table 136 is generated (after S103), the rendering region setting unit 123 selects a divided area to be processed from among divided areas (S104). Since the rasterization is performed for each divided area in the divided-area-based rendering, the rendering region setting unit 123 outputs information indicating a current divided area to be processed.

Hereinafter, a case is described where an area ID used by the table generating unit 113 is used as information indicating a divided area. In FIG. 10, when the top-left divided area is to be processed, the rendering region setting unit 123 sets (XID, YID)=(0, 0), and when the bottom-right divided area is to be processed, the rendering region setting unit 123 sets (XID, YID)=(7, 3). Then, the rendering region setting unit 123 transmits to the determining unit 121 an area ID indicating the divided area to be processed.

The command receiving unit 111B receives a rendering command 131 including a pointer for polygon data 132. The command receiving unit 111B fetches a polygon rendering start command 411 and notifies the determining unit 121 of the fetching, while the command receiving unit 111A fetches a polygon rendering start command 411 and notifies the coordinate converting unit 112 of the fetching.

The determining unit 121 determines, using the area-by-polygon table 136, a polygon included in the divided area to be processed (S105). Specifically, the determining unit 121 determines, by referring to the area-by-polygon table 136, whether each polygon is within the divided area to be processed, and deletes any polygon determined to be out of the divided area.

Here, an order and the number of polygons processed by the coordinate converting unit 112 need to match an order and the number of polygons processed by the determining unit 121, or the numbers of polygons need to match between a time of generating a table and a time of rendering, and the same identification numbers need to be assigned to the same polygons between the time of generating a table and the time of rendering. The following describes operations (S105 and S106) performed by the determining unit 121 and the area rendering unit 122 with reference to a flow chart shown in FIG. 18.

First, the determining unit 121 selects a polygon N to be processed (S161). Specifically, the determining unit 121 obtains an area ID (XID, YID) indicating a divided area to be processed and information indicating the polygon N ($0 \leq N <$ a total number of polygons) from the rendering region setting unit 123 and the command receiving unit 111B, respectively.

Next, the determining unit 121 calculates an entry number of an entry included in the area-by-polygon table 136 and holding area information about the polygon N, using a polygon number N indicating a polygon processing order or an identification number N unique to each polygon (S162). This calculation method depends on the integration processing performed by the table generating unit 113. For instance, the area information about the polygon N is held in the entry (N % TMAX) based on the method described first as the exemplary integration processing. In other words, the determining unit 121 determines an entry holding area information about a polygon to be processed, according to the procedure of the table generating unit 113. Specifically, the table generating unit 113 sequentially selects polygons as target polygons, according to an order of data items of the polygons included in the rendering command 131. The determining unit 121 associates, using the above order, the polygons and area information items stored in entries. Alternatively, the table generating unit 113 sequentially selects unit polygons as target unit polygons, according to unique identification numbers N assigned to polygons included in the rendering command 131. The determining unit 121 associates, using the identification numbers N, the polygons and area information items stored in entries.

Next, the determining unit 121 obtains the area information about the polygon to be processed from the entry included in the area-by-polygon table 136 and having the entry number calculated in step S162 (S163). Here, the area information indicates a two-dimensional boundary box, and specifically includes the minimum area ID (minXID, minYID) and the maximum area ID (maxXID, maxYID) of the boundary box.

Next, the determining unit 121 determines whether the divided area to be processed is within the boundary box (S164). Specifically, when minXID$\leq$XID$\leq$maxXID and minYID$\leq$YID$\leq$maxYID are satisfied, the polygon N is within the divided area to be processed.

Since it is not necessary to rasterize the polygon N when the polygon N is not within the divided area to be processed (No in S164), the determining unit 121 determines not to perform processing on the polygon N and deletes the polygon N (S165). To put it another way, the determining unit 121 excludes the polygon N from a rendering target of the divided area to be processed.

In contrast, when the polygon N is within the divided area to be processed (Yes in S164), the determining unit 121 determines that the polygon N is to be rendered since there is a possibility that the polygon N is a target of rasterization, and notifies the area rendering unit 122 of the determination (S166).

Then, the area rendering unit 122 performs rendering on the polygon to be rendered (S106A). Specifically, the area rendering unit 122 loads polygon data 132 of the polygon to be rendered, and performs vertex processing, rasterization, and transferring to the final rendering region. Stated differently, the area rendering unit 122 loads, for the polygon determined to be rendered by the determining unit 121, not only vertex coordinates but also all necessary vertex attributes, performs appropriate vertex processing, and finally performs rasterization on the divided area.

As stated above, the determining unit 121 and the area rendering unit 122 operate in parallel. In other words, the determining unit 121 performs determination processing on a subsequent polygon while performing rendering of a polygon.

When the above processing is not performed on all the polygons (No in S167), the next polygon is selected (S161), and step S162 and the subsequent processing are performed on the selected polygon.

Moreover, after rasterizing all the polygons determined to be rendered with respect to the divided areas to be processed, the area rendering unit 122 transfers pixel data 137 that is the results of rasterization, to memory regions corresponding to the divided areas to be processed in the final rendering region.

When the above processing (S104 to S106) is not performed on all the divided areas (No in S107), the next divided area is selected (S104), and step S105 and the subsequent processing are performed on the selected divided area.

As stated above, the polygon shape processing unit 110 performs the processing for generation of the area-by-polygon table 136 only once for one frame (scene) of a rendering target. Moreover, the polygon-by-area rendering unit 120 performs, by referring to the generated area-by-polygon table 136, the rendering (S105 and S106) as many times as the number of the divided areas.

As described above, the divided-area-based rendering device 100 according to this embodiment calculates the area information items about the polygons, and generates the area-by-polygon table 136 that is the table in which the area information items are associated with the respective polygons. Then, the divided-area-based rendering device 100 determines, by referring to the area-by-polygon table 136 in the divided-area-based rendering, whether each polygon is within the divided area to be processed. The divided-area-based rendering device 100 loads the polygon data only for the polygon determined to be within the divided area to be processed, and performs the vertex processing, the rasterization, and the transferring. With this, even when a lot of visible polygons are present, the divided-area-based rendering device 100 is capable of performing the divided-area-based rendering without exceeding the size of the memory region previously reserved. As a result, it is possible to greatly reduce the memory bandwidth.

Embodiment 2

Embodiment 2 describes a modification of the divided-area-based rendering device 100 according to Embodiment 1.

Figure 19:
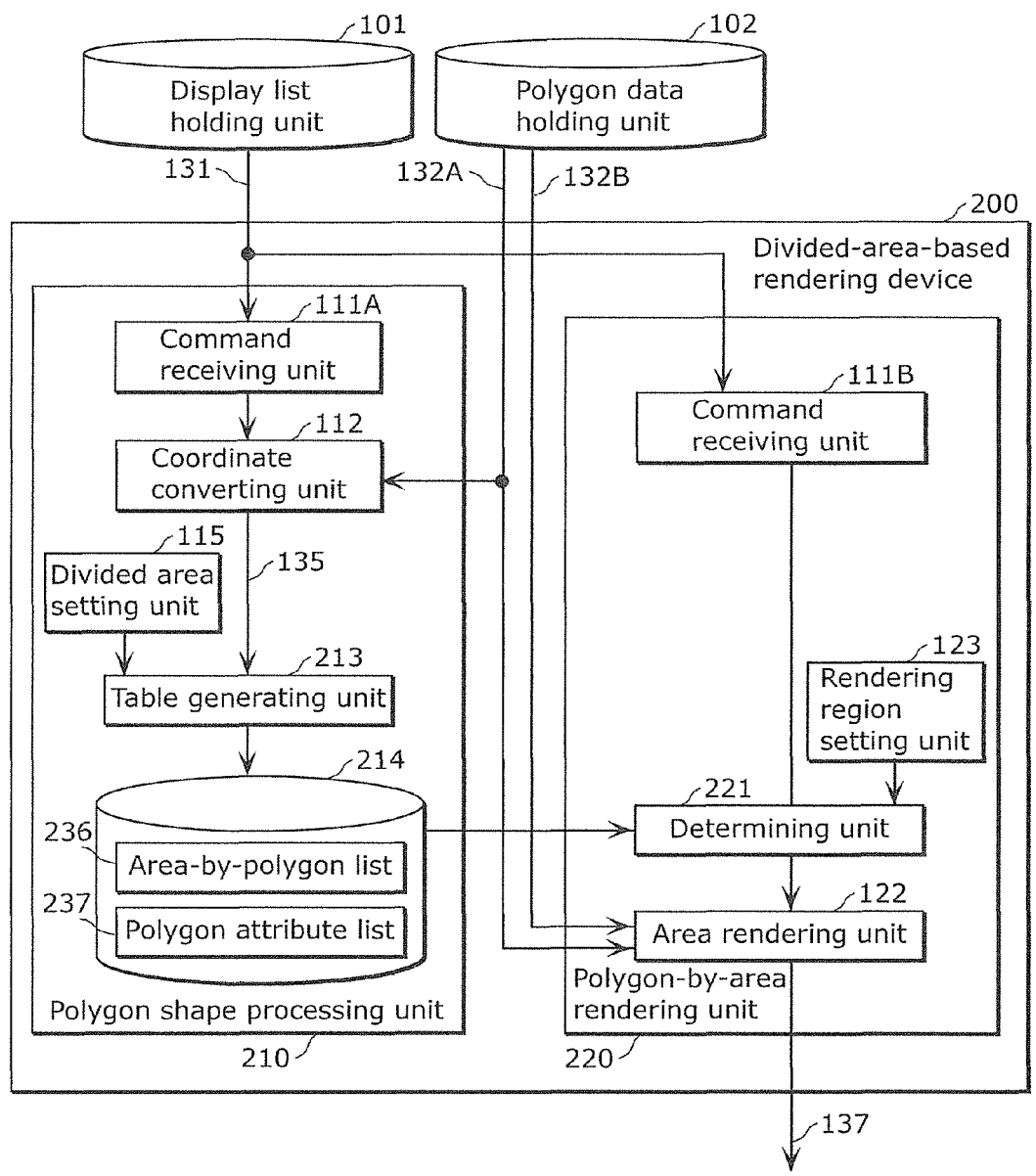
FIG. 19 is a block diagram illustrating a configuration of a divided-area-based rendering device according to Embodiment 2.
Figure 20:
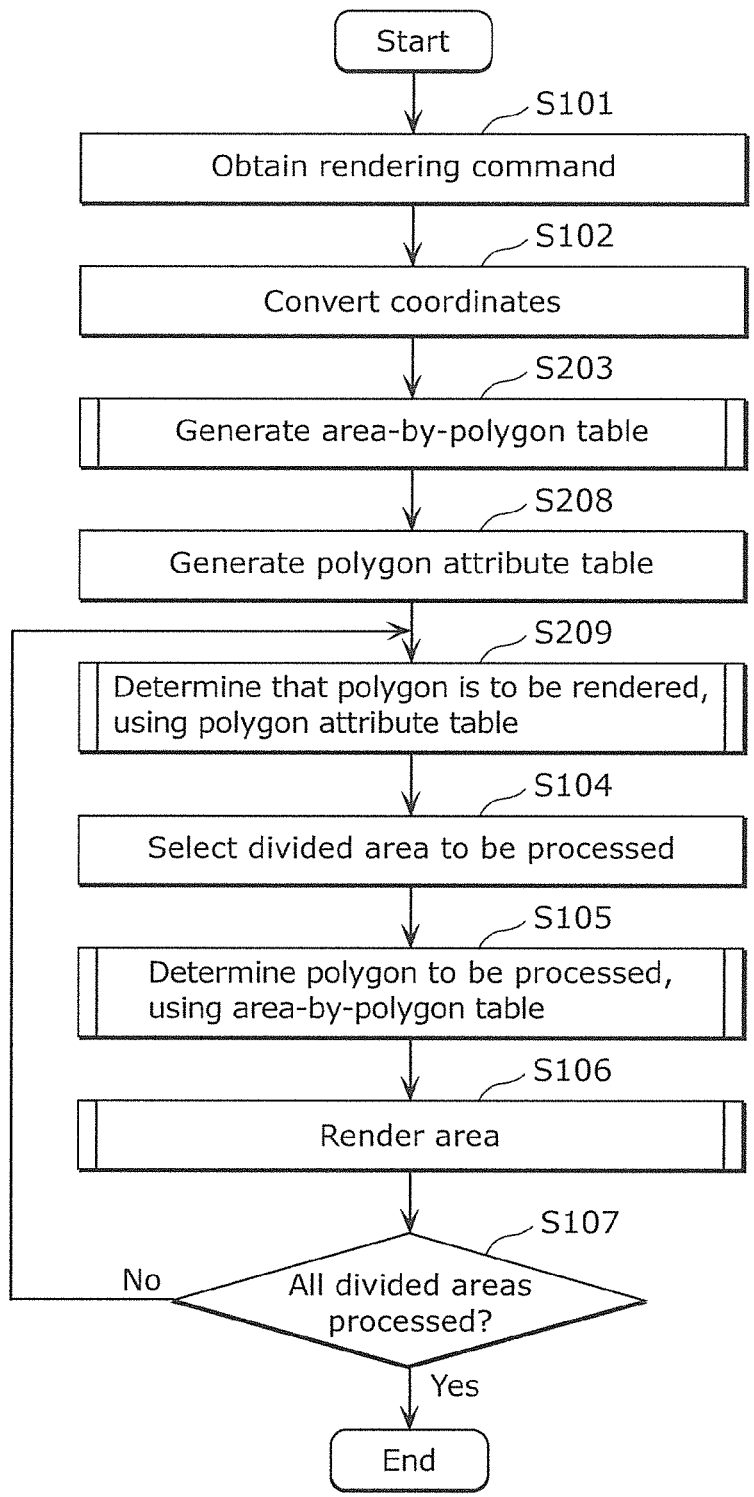
FIG. 20 is a flow chart for a divided-area-based rendering method according to Embodiment 2.

FIG. 19 is a block diagram illustrating a configuration of a divided-area-based rendering device 200 according to this embodiment. FIG. 20 is a flow chart for a divided-area-based rendering method performed by the divided-area-based rendering device 200. It is to be noted that the same reference signs are assigned to the same elements as those in FIG. 3 and FIG. 5, and descriptions thereof are omitted.

In the divided-area-based rendering device 200 shown in FIG. 19, the functions of a table generating unit 213 and a table holding unit 214 included in a polygon shape processing unit 210 and a determining unit 221 included in a polygon-by-area rendering unit 220 are different from those of the table generating unit 113, the table holding unit 114, and the determining unit 121 shown in FIG. 3.

As shown in FIG. 20, after coordinate conversion processing (S102), the table generating unit 213 generates an area-by-polygon table 236 (S203). Here, in table generating processing (S203), the following point differs from Embodiment 1. The table generating unit 213 calculates, only for a polygon to which an invalid flag is not added, area information, and stores the calculated area information into the area-by-polygon table 236. In other words, the table generating unit 213 does not calculate, for a polygon to which an invalid flag is added, area information, and store the calculated area information into the area-by-polygon table 236.

Next, the table generating unit 213 generates a polygon attribute table 237 (S208). Specifically, the table generating unit 213 determines a polygon attribute indicating whether each polygon is a valid polygon or an invalid polygon, depending on whether the invalid flag is added to the polygon. Then, the table generating unit 213 counts, using the polygon attribute, the number of consecutive polygons having the same polygon attribute, and stores a set of the polygon attribute and the number of the consecutive polygons having the same polygon attribute into one entry of the polygon attribute table every time the polygon attribute changes.

The table holding unit 214 holds the area-by-polygon table 236 and the polygon attribute table 237.

Hereinafter, operations in step S208 are described with reference to FIG. 21. Information 501 input from the coordinate converting unit 112 is a set of screen positions of Polygons 0 to 8 and invalid flags. Since no invalid flag is added to Polygons 0, 1, 6, 7, and 8, these polygons are valid polygons and have polygon attributes 502 indicating valid. Since invalid flags are added to Polygons 2, 3, 4, and 5, these polygons are invalid polygons that are not to be rendered in all divided areas, and have polygon attributes 502 indicating invalid.

Figure 21:
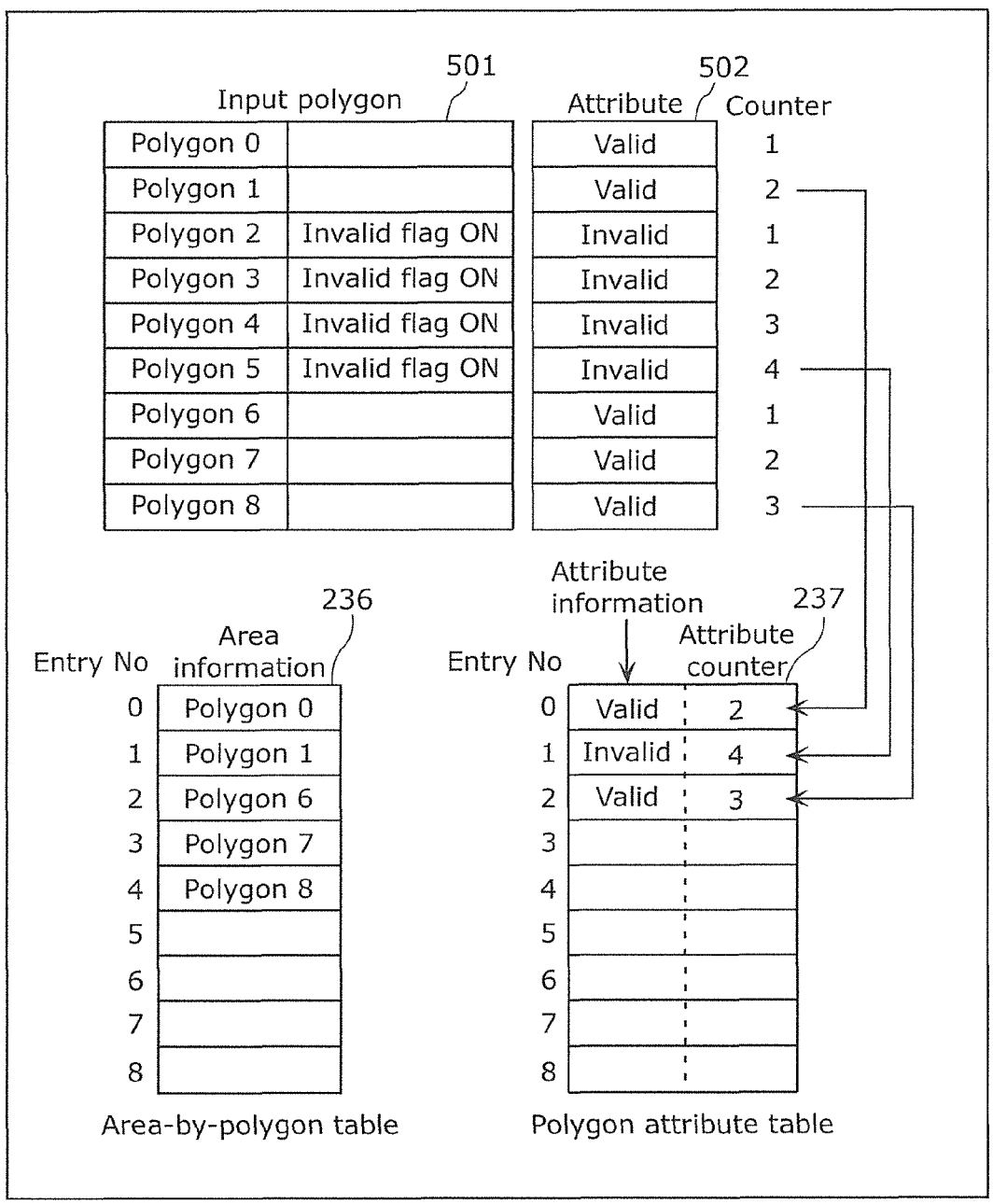
FIG. 21 is a diagram for describing a polygon attribute table generation processing according to Embodiment 2.

As shown in FIG. 21, the table generating unit 213 calculates, only for valid Polygons 0, 1, 6, 7, and 8, area information items, and stores the area information items into entries included in the area-by-polygon table 236. In contrast, the table generating unit 213 does not calculate, for invalid Polygons 2, 3, 4, and 5, area information items, and store the area information items into entries.

The table generating unit 213 includes a counter that counts how many same polygon attributes 502 continue, and stores a set of attribute information and an attribute count value into one entry of the polygon attribute table (1) every time a polygon attribute changes, (2) every time a count value reaches an upper limit value that an attribute counter is capable of holding, or (3) when all polygons are processed. Here, the attribute information is information indicating an invalid polygon or a valid polygon (invalid or valid). The attribute counter indicates the number of polygons consecutively input and having a corresponding polygon attribute.

As stated above, the table generating unit 213 counts the numbers of consecutive valid polygons and consecutive invalid polygons among the polygons, and generates the polygon attribute table 237 indicating the numbers of the consecutive valid polygons and the consecutive invalid polygons.

In an example shown in FIG. 21, when valid Polygons 0 and 1 continue and the polygon attribute 502 changes to invalid, "Valid, 2" is stored into Entry 0 of the polygon attribute table 237. Next, when invalid Polygons 2, 3, 4, and 5 continue and the polygon attribute 502 changes to valid, "Invalid, 4" is stored into Entry 1 of the polygon attribute table 237. Then, when valid Polygons 6, 7, and 8 continue and after all the polygons are processed, "Valid, 3" is stored into Entry 2 of the polygon attribute table 237.

As seen above, by generating the polygon attribute table 237 separately from the area-by-polygon table 236, it is possible to prevent the entries of the area-by-polygon table 236 from being used for the area information items about the invalid polygons for which area management is originally unnecessary. Moreover, the above-described integration processing is prevented from easily occurring by storing the area information items about only the valid polygons into the area-by-polygon table 236. This makes it possible to suppress a reduction in accuracy of the area information.

The determining unit 221 uses the polygon attribute table 237.

The determining unit 221 determines, by referring to the polygon attribute table 237, whether each polygon is to be rendered (S209). Moreover, the determining unit 221 deletes any polygon determined to be not rendered. In other words, the determining unit 221 deletes any polygon not to be rendered without depending on a divided area. Specifically, the determining unit 221 deletes any polygon to be culled, any polygon all the vertices of which are out of a final rendering region due to clipping, and so on.

Figure 22:
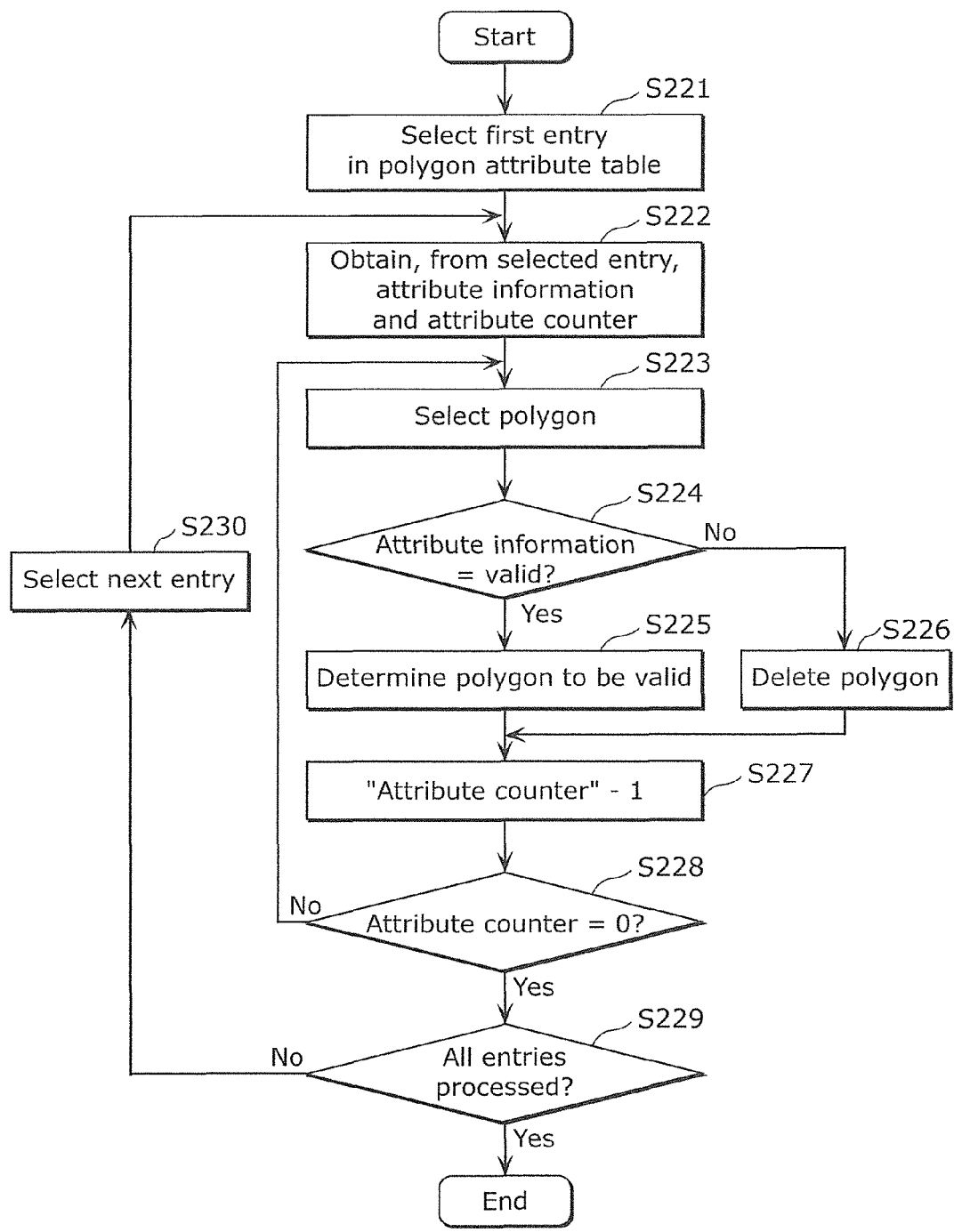
FIG. 22 is a flow chart illustrating operations in determination processing using a polygon attribute table according to Embodiment 2.

FIG. 22 is a flow chart illustrating details of processing in step S209.

First, the determining unit 221 selects the first entry in the polygon attribute table 237 (S221). Specifically, the determining unit 221 initializes, to 0, an entry number ENTRYID of an entry to be selected.

Next, the determining unit 221 obtains attribute information and an attribute count value from the selected entry (ENTRYID=0) (S222).

Next, the determining unit 221 selects a polygon to be processed (S223). Next, the determining unit 221 determines whether the obtained attribute information indicates valid or invalid (S224).

When the attribute information indicates valid (Yes in S224), the determining unit 221 determines that the polygon to be processed is a valid polygon (S225). Moreover, step S104 and the subsequent processing shown in FIG. 20 are performed only on the polygon determined to be the valid polygon.

In contrast, when the attribute information indicates invalid (No in S224), the determining unit 221 determines that the polygon to be processed is an invalid polygon and deletes the polygon at this point (S226).

After step S225 or S226, the determining unit 221 decrements the attribute count value by one (S227).

Next, the determining unit 221 determines whether the attribute count value is 0 (S228). To put it another way, the determining unit 221 determines whether a polygon attribute changes.

When the attribute count value is not 0 (No in S228), the same polygon attribute still continues, and thus the determining unit 221 selects the next polygon (S223) and performs step S224 and the subsequent processing on the selected polygon.

In contrast, when the attribute count value is 0 (Yes in S228) and processing is not performed on all valid entries included in the polygon attribute table 237 (No in S229), the polygon attribute changes, and the determining unit 221 selects the next entry (S230). Specifically, the determining unit 221 increments ENTRYID by one. Then, the determining unit 221 performs step S222 and the subsequent processing on the newly selected entry.

In contrast, when processing is performed on all the entries included in the polygon attribute table 237 in step S229, the determining unit 221 completes the determination processing (S209) using the polygon attribute table 237, and performs step S104 and the subsequent processing using the polygons determined to be valid.

As stated above, the determining unit 221 determines, by referring to the polygon attribute table 237, whether each of the polygons is the valid polygon or the invalid polygon. Next, the determining unit 221 determines, for each of the divided areas, a rendering polygon that is one of the valid polygons which is associated with the divided area, by referring to the area-by-polygon table 236.

As described above, the divided-area-based rendering device 200 according to this embodiment calculates only the area information items about the valid polygons, and stores only the area information items about the valid polygons into the area-by-polygon table 236. Moreover, the divided-area-based rendering device 200 stores, into the polygon attribute table 237, the number of the consecutive polygons having the same polygon attribute in association with the attribute information indicating valid or invalid. The divided-area-based rendering device 200 first deletes the invalid polygons by referring to the polygon attribute table 237 when performing the divided-area-based rendering, and then performs the rendering for each divided area by referring to the area-by-polygon table 236. Specifically, the divided-area-based rendering device 200 determines whether each polygon is within a divided area to be processed, and performs loading of polygon data, vertex processing, rasterization, and transferring only on the polygon determined to be within the divided area.

As stated above, the divided-area-based rendering device 200 does not hold the area information items about the invalid polygons in the area-by-polygon table 236. With this, the divided-area-based rendering device 200 is capable of reducing the occurrence of the integration processing when a lot of visible polygons are present, and thus suppressing a reduction in accuracy of the area information caused by the integration processing. Moreover, as with Embodiment 1 described above, the divided-area-based rendering device 200 is capable of performing the divided-area-based rendering without exceeding the size of the memory region previously reserved. With this, the divided-area-based rendering device 200 is capable of reducing a memory bandwidth.

Embodiment 3

Embodiment 1 has described the example where the boundary box is used as the information indicating the divided area to which the polygon belongs. Embodiment 3 describes an example where a boundary bit is used as division information.

Figures 23A, 23B:
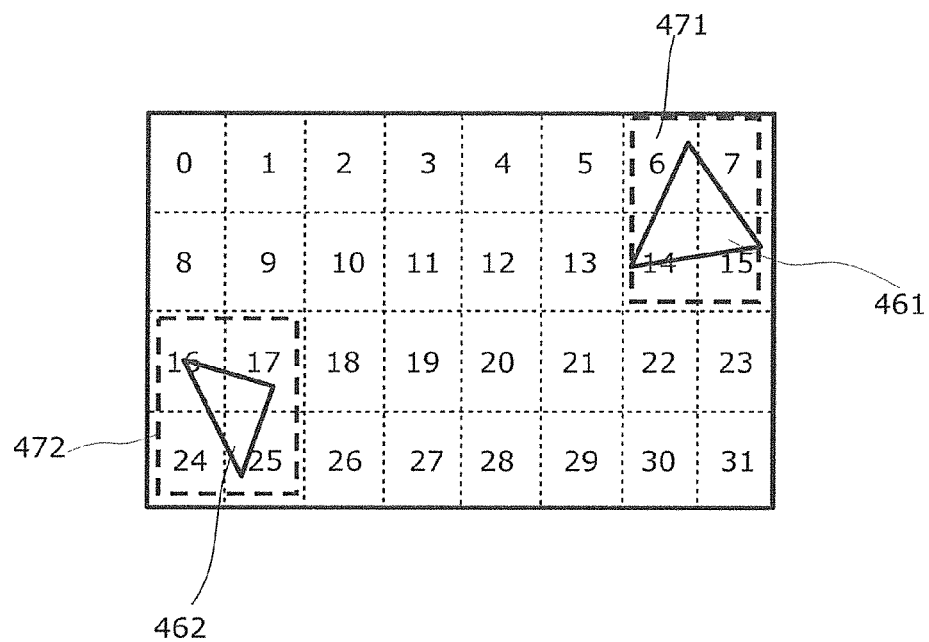
FIG. 23A is a diagram for describing boundary bits according to Embodiment 3.
FIG. 23B is a diagram illustrating an exemplary area-by-polygon table according to Embodiment 3.

FIG. 23A is a diagram illustrating a final rendering region divided horizontally into eight divided areas and vertically into four divided areas. In this case, the 32 divided areas are present which have area IDs ranging from 0 to 31. A polygon 461 is included in a region 471 including the divided areas having the area IDs 6, 7, 14, and 15. A polygon 462 is included in a region 472 including the divided areas having the area IDs 16, 17, 24, and 25.

FIG. 23B is a diagram illustrating an exemplary area-by-polygon table 136 in the case shown in FIG. 23A. As shown in FIG. 23B, a boundary bit is stored as division information into an entry corresponding to each polygon. Here, the boundary bit is information including the same number of bits as the number of divided areas and associating each divided area with one bit. In this example, since the 32 divided areas are present, the boundary bit is information including 32 bits. Moreover, each one bit indicates whether the divided area associated with the one bit includes a polygon corresponding to an entry. In other words, each one bit indicates whether the divided area associated with the one bit includes a first area including a polygon corresponding to an entry. Here, the first area is an area including a polygon.

Moreover, in the example, when 1-bit information indicates "1," the 1-bit information indicates that a divided area includes a polygon, and when 1-bit information indicates "0," the 1-bit information indicates that a divided area does not include a polygon.

It is to be noted that although the example is described here where the one bit is associated with each divided area, one bit may be associated with each unit area including divided areas. The details of the association of the one bit with each unit area are described later.

Hereinafter, integration processing when boundary bits are used is described. In the case of using the boundary bits, the table generating unit 113 adds two boundary bits to be integrated, to compute an integrated boundary bit. In this way, it is possible to reduce an amount of computation by using the boundary bits as compared to the case of using the boundary box.

Figure 24:
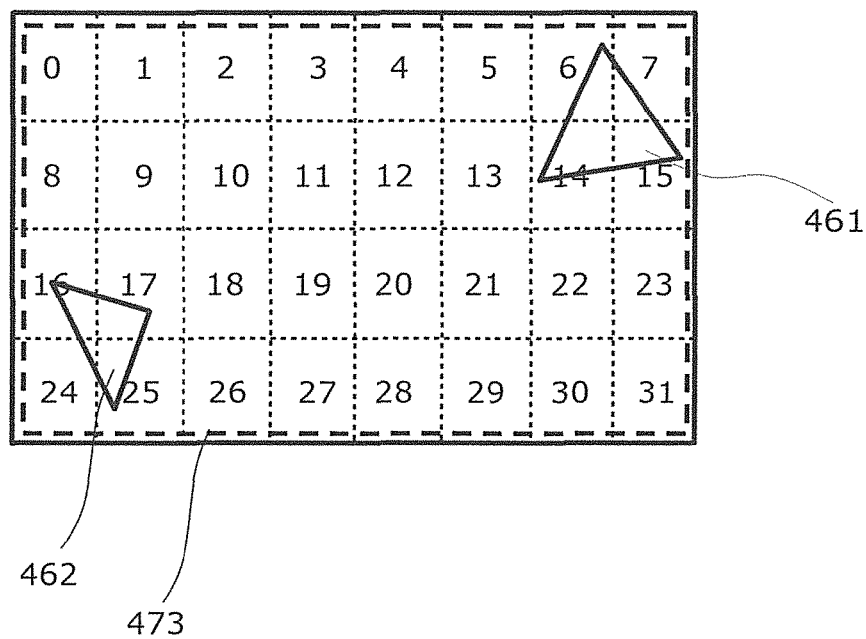
FIG. 24 is a diagram illustrating an exemplary boundary box after integration processing according to Embodiment 3.

Moreover, by using the boundary bits, it is possible to prevent a region including a polygon from being set to be unnecessarily large in the integration processing. FIG. 24 is a diagram illustrating an exemplary region 473 including polygons 461 and 462 when the integration processing is performed using the boundary boxes in the example shown in FIG. 23A. When the two polygons 461 and 462 are disposed apart as shown in FIG. 24, the region 473 including the two polygons 461 and 462 is set to be large in the case of using a boundary box. In contrast, in the case of using the boundary bits, the regions 471 and 472 shown in FIG. 23A are directly set as an integrated region including the polygons 461 and 462. In this way, by using the boundary bits, it is possible to prevent an unnecessary polygon from being determined to be rendered in rendering of a divided area.

The number of bits of a boundary bit is preferably fixed to a predetermined number of bits. To put it another way, the number of the bits of the boundary bit stays constant even when the number of divided areas changes. Hereinafter, a case is described where the number of the bits of the boundary bit is fixed to 64 bits of eight vertical bits by eight horizontal bits.

Figure 25A:
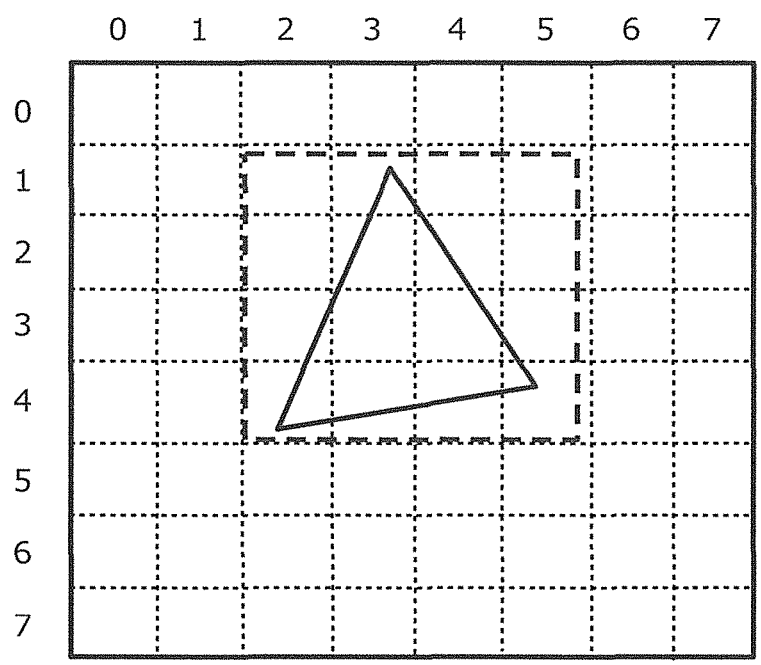
FIG. 25A is a diagram for describing boundary bits according to Embodiment 3.

FIG. 25A is a diagram illustrating a final rendering region including 64 divided areas of eight vertical divided areas by eight horizontal divided areas. In this case, a different divided area is associated with each one bit of the 64 bits. Stated differently, one unit area includes one divided area.

Figure 25B:
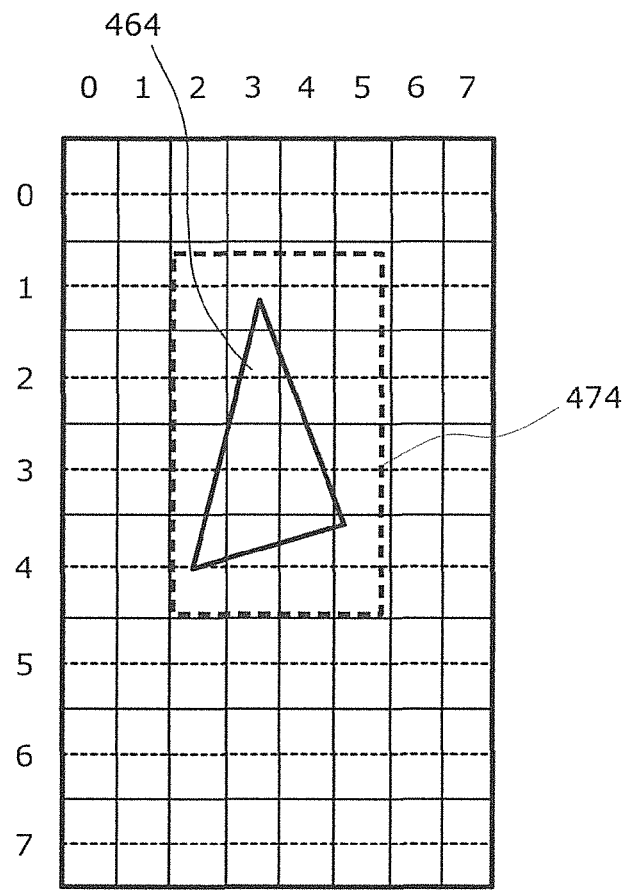
FIG. 25B is a diagram for describing boundary bits according to Embodiment 3.

FIG. 25B is a diagram illustrating a final rendering region including 128 divided areas of sixteen vertical divided areas by eight horizontal divided areas. In this case, different two vertical divided areas are associated with each one bit of the 64 bits. Stated differently, one unit area includes two divided areas. Specifically, the different two vertical divided areas are associated with each one bit of the eight vertical bits.

Figure 25C:
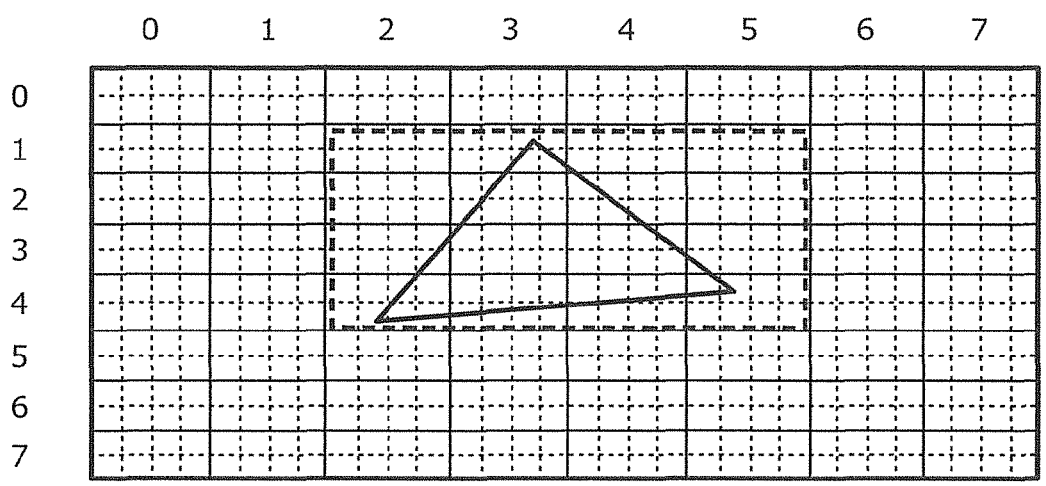
FIG. 25C is a diagram for describing boundary bits according to Embodiment 3.

FIG. 25C is a diagram illustrating a final rendering region including 512 divided areas of sixteen vertical divided areas by thirty-two horizontal divided areas. In this case, different eight divided areas of two vertical divided areas by four horizontal divided areas are associated with each one bit of the 64 bits. Stated differently, one unit area includes eight divided areas. Specifically, different two vertical divided areas are associated with each one bit of the eight vertical bits, and different four horizontal divided areas are associated with each one bit of the eight horizontal bits.

As stated above, by fixing the number of the bits of the boundary bit, it is possible to suppress an increase in an amount of data of area information. Moreover, the table generating unit 113 is capable of generating an area table having a predetermined amount of data, without depending on the number of polygons to be rendered and the number of divided areas.

However, when divided areas are associated with one bit of the boundary bit, the accuracy of setting a region including a polygon decreases as compared to the case of using the boundary box.

Figures 26, 27:
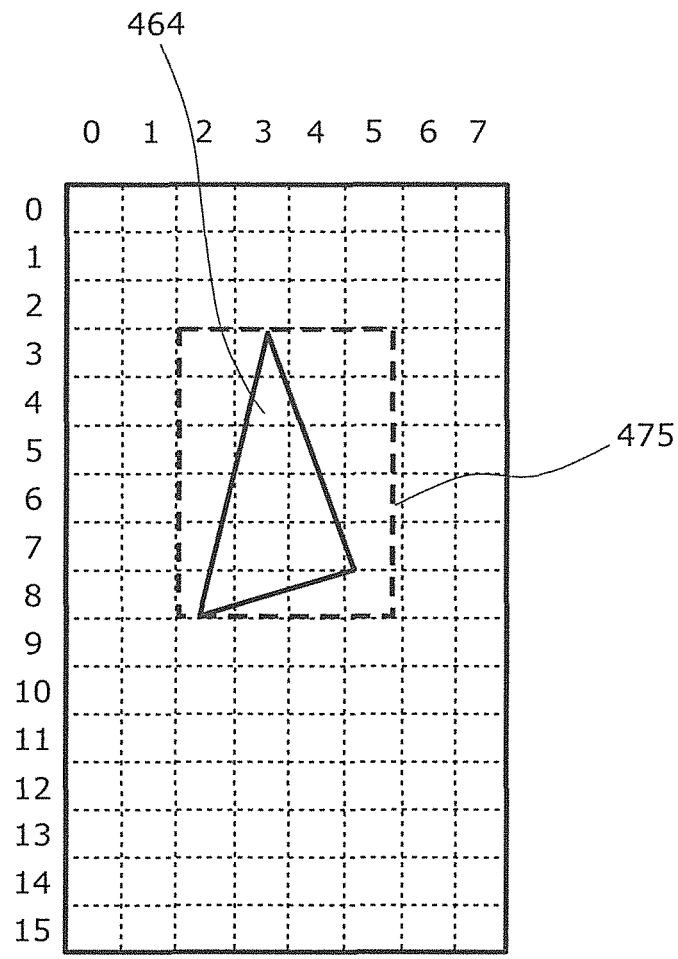
FIG. 26 is a diagram illustrating an exemplary boundary box according to Embodiment 3.
FIG. 27 is a diagram illustrating another exemplary area-by-polygon table according to Embodiment 3.

FIG. 26 is a diagram illustrating a region 475 indicated by a boundary box and including a polygon 464. The region 474 indicated by the boundary bit shown in FIG. 25B is larger than the region 475 indicated by the boundary box, and includes redundant areas.

As stated above, it is possible to set an appropriate region after the integration processing when the boundary bit is used. On the other hand, by using the boundary box, it is possible to maintain the accuracy of setting a region without depending on the number of divided areas. It is to be noted that although there is a possibility that an amount of data of information indicating a boundary box increases when the number of divided areas increases, the increased amount is sufficiently less than an increased amount of data of a boundary bit.

In order to utilize such an advantage of each information, each area information included in the area-by-polygon table 136 may include both a boundary bit and information indicating a boundary box. FIG. 27 is a diagram illustrating an exemplary area-by-polygon table 136 when the area information includes both a boundary bit and information indicating a boundary box.

Figure 28:
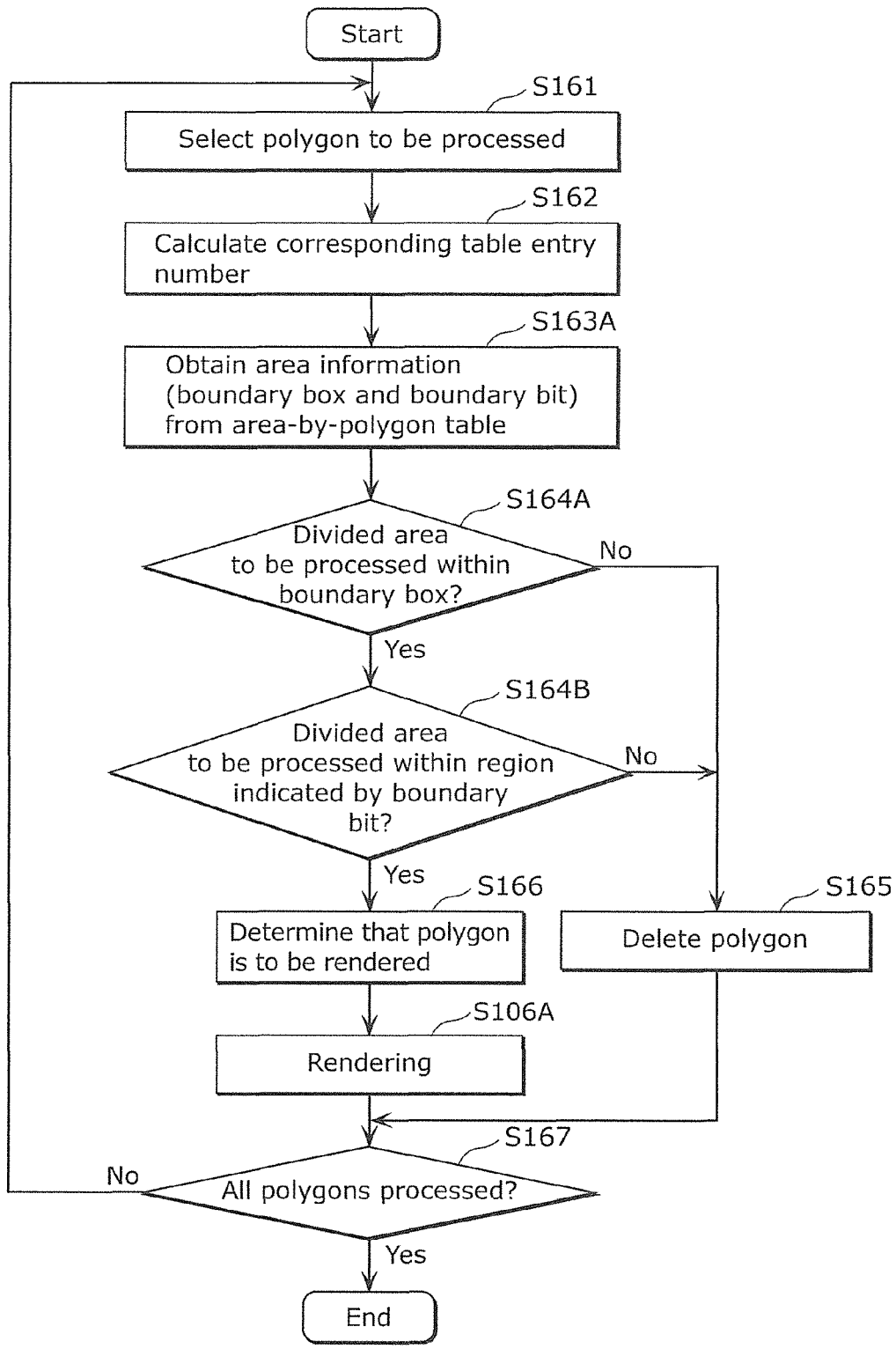
FIG. 28 is a flow chart illustrating operations in determination processing according to Embodiment 3.

FIG. 28 is a flow chart illustrating operations performed by the determining unit 121 and the area rendering unit 122 in the above case. Step S163A in processing shown in FIG. 28 differs from step S163 in the processing shown in FIG. 18. Moreover, the processing shown in FIG. 28 includes steps S164A and S164B instead of step S164. It is to be noted that regarding the same processes as those in FIG. 18, descriptions thereof are omitted.

In step S163A, the determining unit 121 obtains area information about a polygon to be processed which is included in the area-by-polygon table 136. This area information includes a boundary bit and information indicating a boundary box.

Next, the determining unit 121 determines whether a divided area to be processed is within the boundary box (S164A). It is to be noted that specific details of the process are the same as in step S164 in Embodiment 1.

When the divided area to be processed is within the boundary box (Yes in S164A), the determining unit 121 determines whether the divided area to be processed is within a region indicated by the boundary bit (S164B). Specifically, when 1-bit information corresponding to the divided area to be processed indicates "1," the determining unit 121 determines that the divided area is within the region indicated by the boundary bit, and when the 1-bit information corresponding to the divided area to be processed indicates "0," the determining unit 121 determines that the divided area is not within the region indicated by the boundary bit.

When the divided area to be processed is within the region indicated by the boundary bit (Yes in S164B), the determining unit 121 determines that a polygon to be processed is to be rendered (S166).

In contrast, when the divided area to be processed is not within the boundary box (No in S164A) or is not within the region indicated by the boundary bit (No in S164B), the determining unit 121 deletes the polygon to be processed (S165).

It is to be noted that the order of steps S164A and S164B may be a different order. For instance, step S164B may be performed prior to step S164A or part of the processes may be performed simultaneously.

As described above, the determining unit 121 determines, for each divided area, a polygon that is one of the polygons which is associated with the divided area in first information indicating a boundary box and with the divided area in a boundary bit (second information), as a rendering polygon.

With this, the divided-area-based rendering device is capable of setting a more appropriate region after the integration processing, and maintaining the accuracy of the setting of the region without depending on the number of the divided areas.

Embodiment 4

Embodiment 4 describes an example where an area-by-polygon-group table 636 is used in addition to the area-by-polygon table 136.

Figure 29:
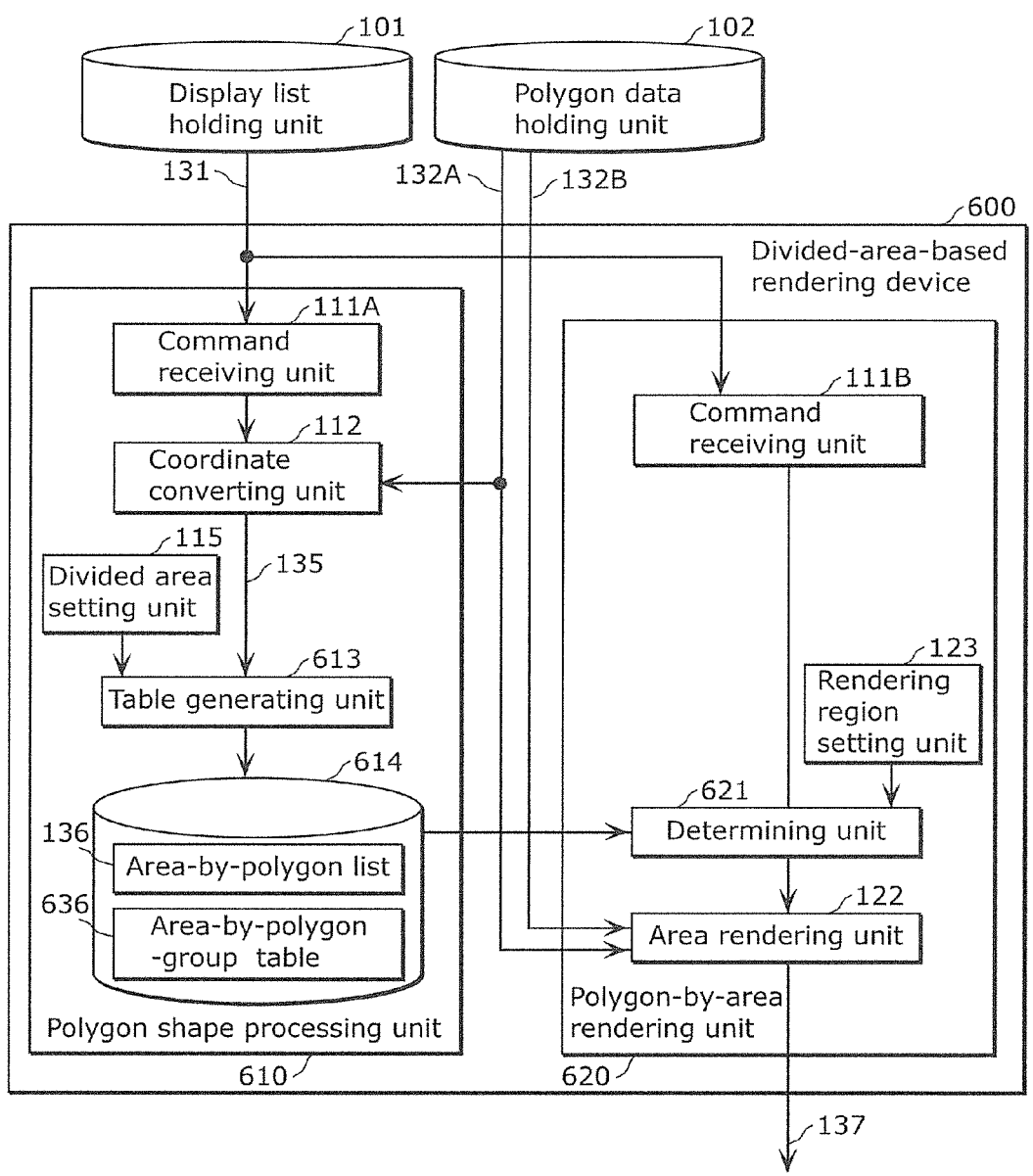
FIG. 29 is a block diagram illustrating a configuration of a divided-area-based rendering device according to Embodiment 4.
Figure 30:
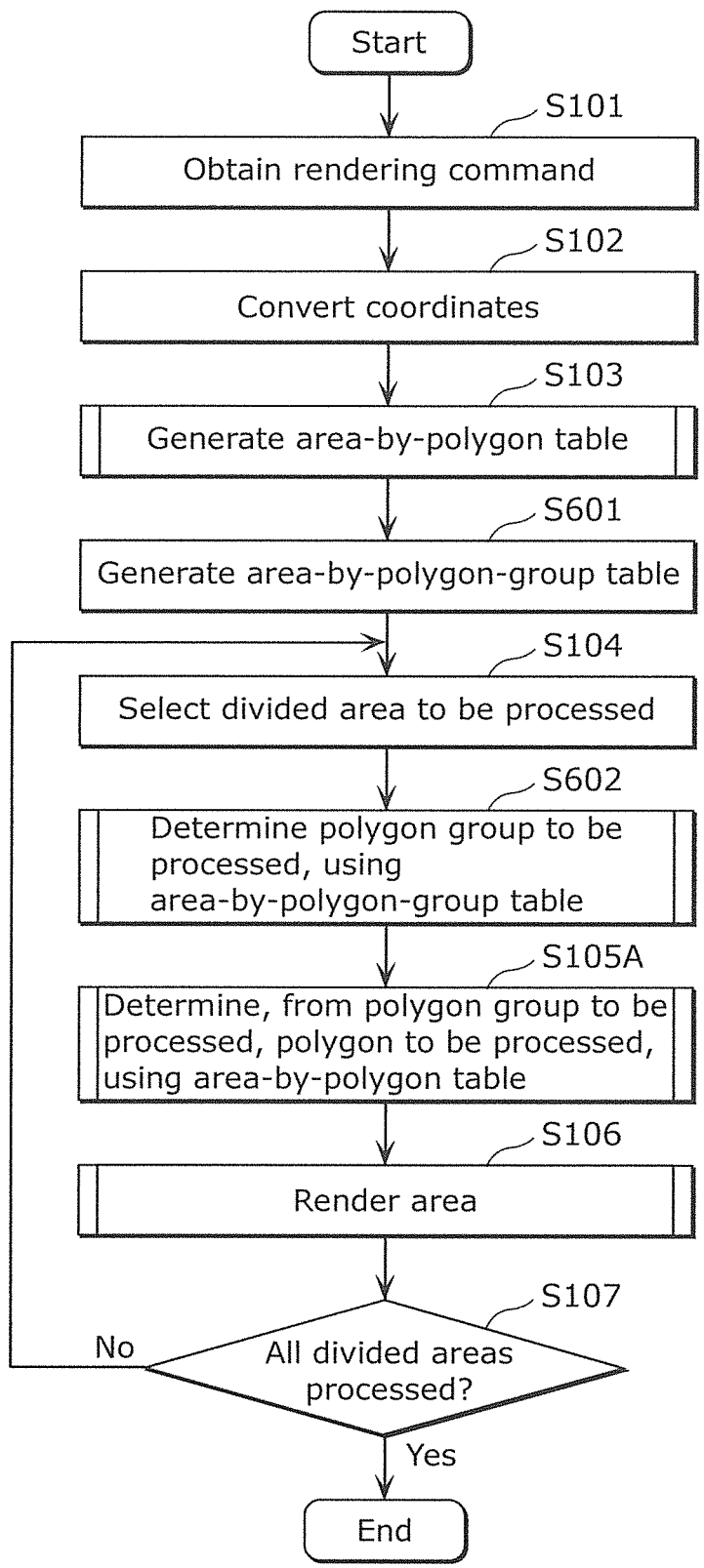
FIG. 30 is a flow chart for a divided-area-based rendering method according to Embodiment 4.

FIG. 29 is a block diagram illustrating a configuration of a divided-area-based rendering device 600 according to this embodiment. FIG. 30 is a flow chart for a divided-area-based rendering method performed by the divided-area-based rendering device 600. It is to be noted that the same reference signs are assigned to the same elements as those in FIG. 3 and FIG. 5, and descriptions thereof are omitted.

In the divided-area-based rendering device 600 shown in FIG. 29, the functions of a table generating unit 613 and a table holding unit 614 included in a polygon shape processing unit 610 and a determining unit 621 included in a polygon-by-area rendering unit 620 are different from those of the table generating unit 113, the table holding unit 114, and the determining unit 121 shown in FIG. 3. Steps S601 and S602 are added to processing shown in FIG. 30 as compared to the processing shown in FIG. 5. Moreover, step S105A is different from step S105.

As shown in FIG. 30, after the processing for generation of an area-by-polygon table (S103), the table generating unit 613 generates an area-by-polygon-group table 636 (S601).

Figures 31, 32:
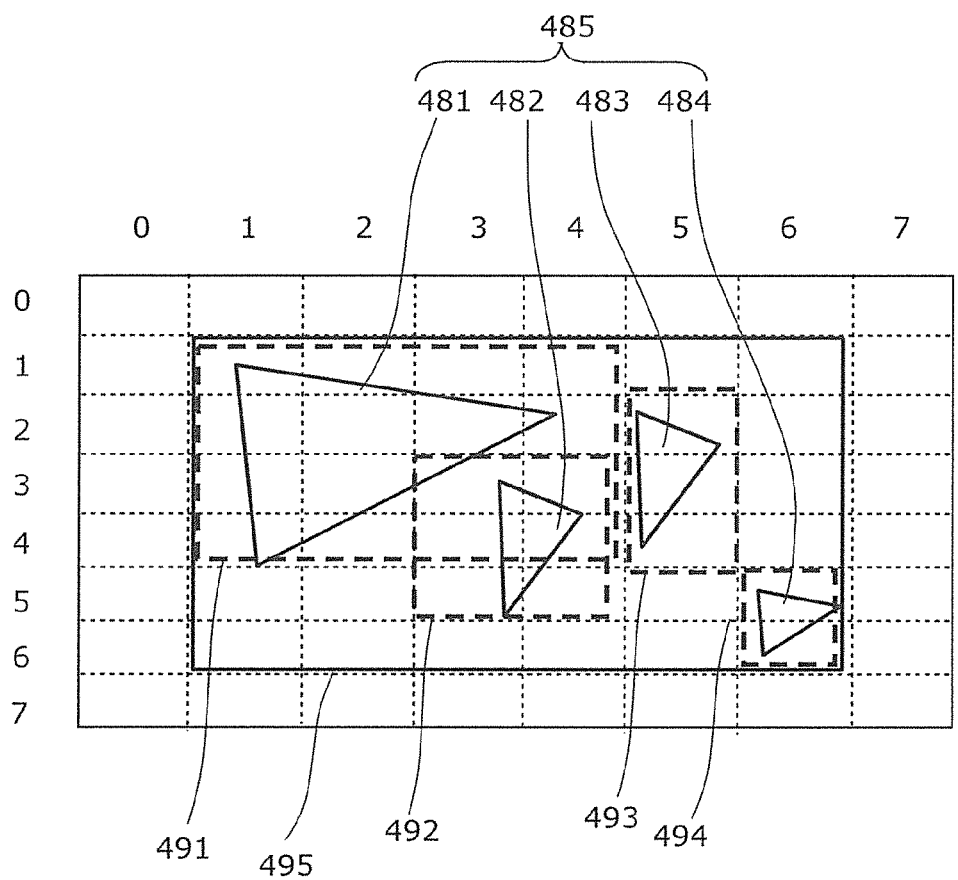
FIG. 31 is a diagram illustrating an exemplary polygon group according to Embodiment 4.
FIG. 32 is a diagram illustrating an exemplary area-by-polygon-group table according to Embodiment 4.

FIG. 31 is a diagram illustrating an exemplary polygon group. A polygon group 485 shown in FIG. 31 includes four polygons 481 to 484. Here, the term "polygon group" refers to a set of polygons corresponding to one object and included in the object. In other words, the polygon group includes polygons close (or adjacent) to each other.

FIG. 32 is a diagram illustrating an exemplary area-by-polygon-group table 636. As shown in FIG. 32, the area-by-polygon-group table 636 includes entries. It is to be noted that the number of the entries may be more than one. Each entry corresponds to a polygon group, and includes area information about the corresponding polygon group and the number of polygons included in the polygon group.

It is to be noted that when integration processing is performed on polygons, each entry may include the number of entries instead of, or in addition to, the number of the polygons. Here, the number of the entries refers to the number of the entries to which the polygons included in the polygon group are assigned in the area-by-polygon table 136.

Although only the processing on one polygon group is described below, the processing may be performed on polygon groups. Moreover, the same processing (e.g. integration processing) as the above-mentioned processing on the polygons may be performed as the processing on the polygon groups.

Although an example is described below where information indicating a boundary box is used as area information as with Embodiment 1, a boundary bit or both of them may be used as with Embodiment 3.

For instance, the table generating unit 613 computes, by the same method as the integration processing, area information (a boundary box 495) about the polygon group 485, using area information items about the polygons 481 to 484 included in the polygon group 485, which are included in the area-by-polygon-group table 636.

It is to be noted that when the boundary bit is used, the area information about the polygon group 485 indicates a region obtained by combining regions 491 to 494 including the polygons 481 to 484.

Next, the rendering region setting unit 123 selects a divided area to be processed from among divided areas (S104).

Next, the determining unit 621 determines, using the area-by-polygon-group table 636, a polygon group included in the divided area to be processed (S602). Specifically, the determining unit 621 determines, by referring to the area-by-polygon-group table 636, whether each polygon group is within the divided area to be processed, and deletes any polygon group determined to be out of the divided area.

Figure 33:
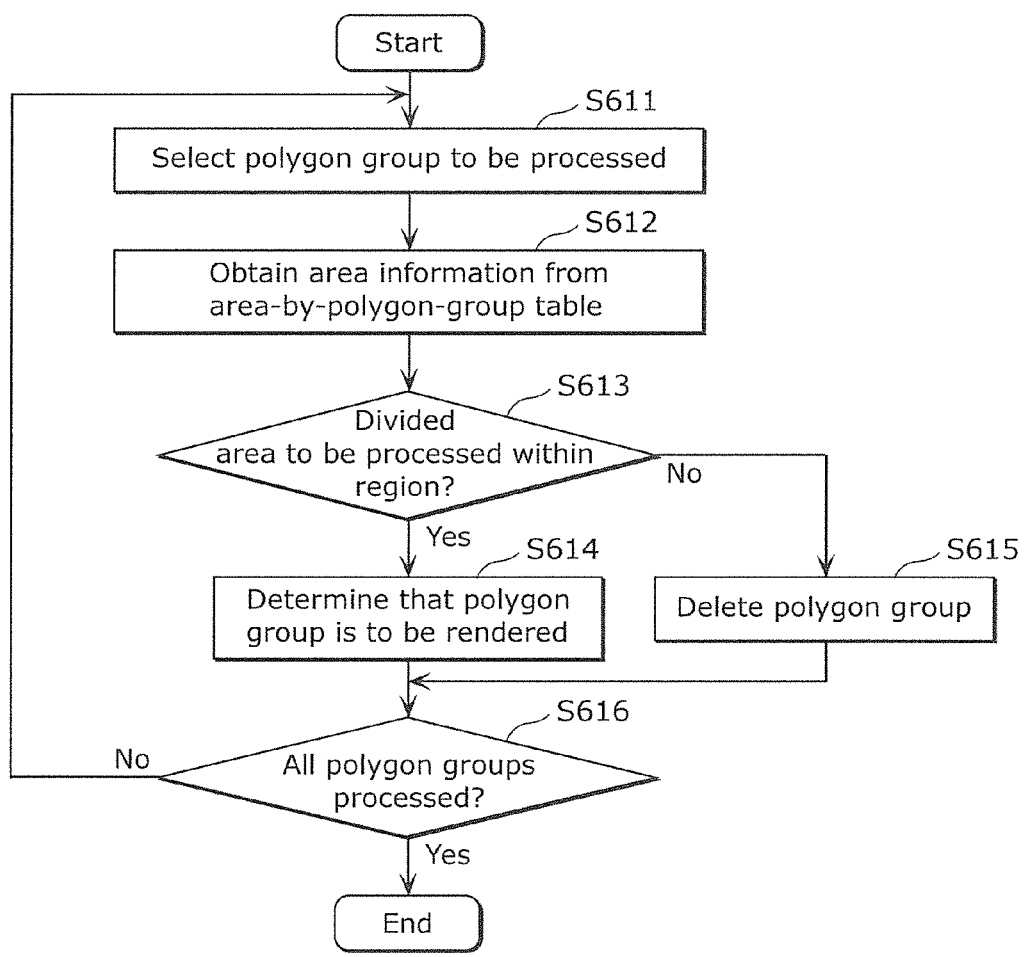
FIG. 33 is a flow chart illustrating operations in polygon group determination processing according to Embodiment 4.

Hereinafter, the determination processing using the area-by-polygon-group table 636 (S602) is described with reference to FIG. 33. FIG. 33 is a flow chart for the determination processing using the area-by-polygon-group table 636 (S602).

First, the determining unit 621 selects a polygon group to be processed (S611). Next, the determining unit 621 obtains area information about the polygon group to be processed, which is included in the area-by-polygon-group table 636 (S612).

Next, the determining unit 621 determines whether the divided area to be processed is within a region (boundary box) indicated in the area information (S613).

When the polygon group to be processed is not within the divided area to be processed (No in S613), the determining unit 621 determines not to perform processing on the polygon group and deletes the polygon group (S615).

In contrast, when the polygon group to be processed is within the divided area to be processed (Yes in S613), the determining unit 621 determines that the polygon group is to be rendered (S614).

When the above processing is not performed on all polygon groups (No in S616), the next polygon group is selected (S611), and step S612 and the subsequent processing are performed on the selected polygon group.

When the processing is performed on all the polygon groups (Yes in S616), step S105A shown in FIG. 30 is performed subsequently.

In step S105A, the determining unit 621 determines, using the area-by-polygon table 136, a polygon to be rendered that is one of the polygons included in the polygon group determined to be rendered. It is to be noted that this process is the same as step S105 (FIG. 18) in Embodiment 1 except for a point that the polygon to be rendered is a polygon included in the polygon group determined to be rendered.

Figure 18:
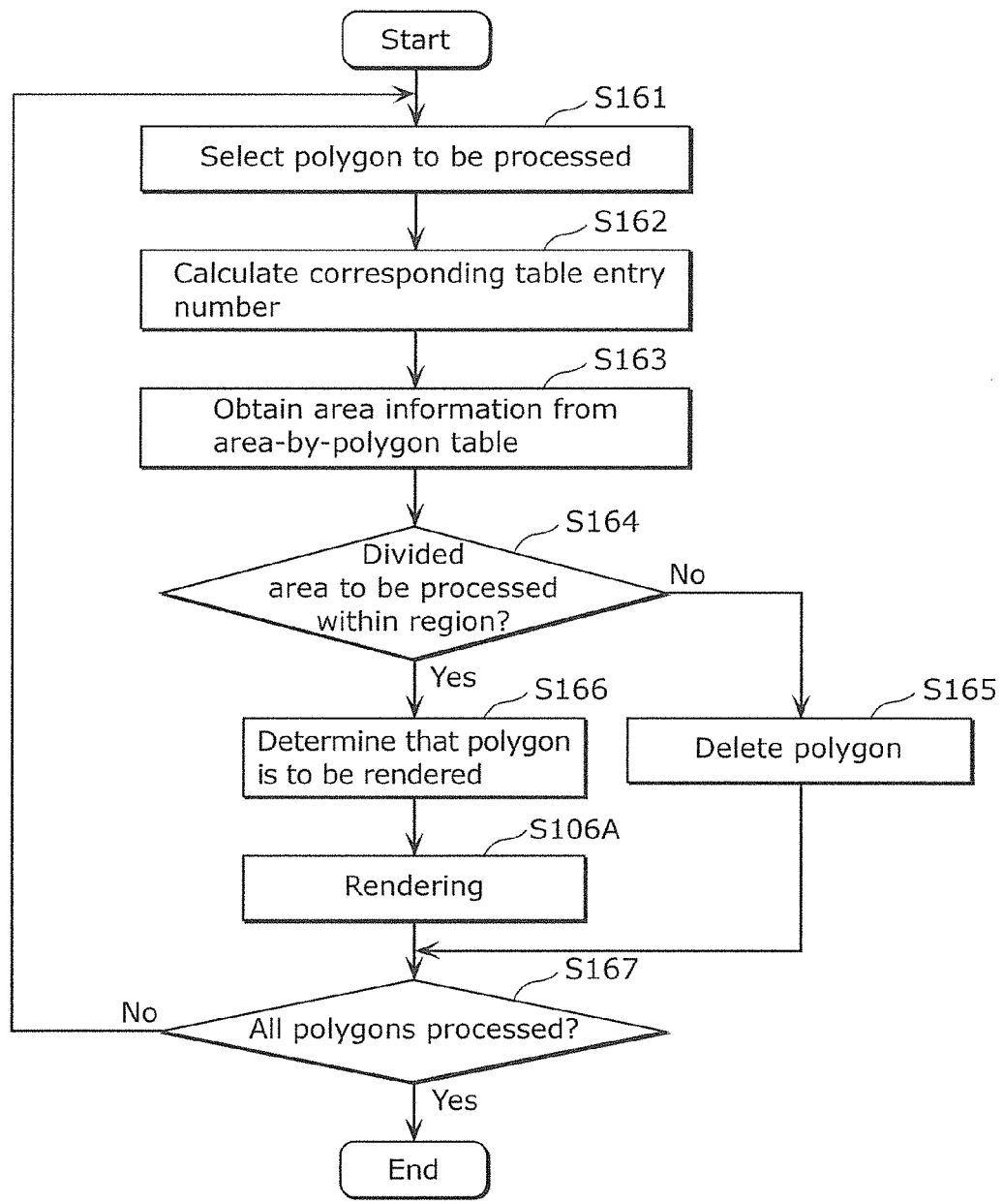
FIG. 18 is a flow chart illustrating operations in determination processing according to Embodiment 1.

However, when data is deleted on a polygon-group-by-polygon-group basis, in step S162 shown in FIG. 18, it is sometimes impossible to calculate an entry number of an entry holding the area information about the polygon to be processed, which is included in the area-by-polygon table 136. In response, the determining unit 621 is capable of calculating the entry number of the entry holding the area information about the polygon to be processed, using the number of the polygons (or the number of entries) included in the polygon group, which is included in the area-by-polygon-group table 636.

As stated above, the table generating unit 613 generates, as an area table, (i) the area-by-polygon-group table 636 (first area table) that is a table in which, for each polygon group, a divided area including at least part of the first area including the polygon group is associated with the polygon group and (ii) the area-by-polygon table 136 (second area table) that is a table in which, for each polygon, a divided area including at least part of the first area including the polygon is associated with the polygon.

The determining unit 621 determines, for each divided area, (i) the rendering polygon group that is one of the polygon groups which is associated with the divided area, by referring to the area-by-polygon-group table 636 and (ii) the rendering polygon that is, among the polygons included in the rendering polygon group, a polygon associated with the divided area, by referring to the area-by-polygon table 136.

The area rendering unit 122 performs, for each divided area, vertex processing and rasterization on the rendering polygon.

It is to be noted that although the determining unit 621 performs the determination on all the polygons included in the polygon group determined to be rendered, after performing the determination on all the polygon groups in the above description, the determining unit 621 may perform the determination on polygons included in a polygon group every time the polygon group is determined to be rendered. To put it another way, the determining unit 621 may repeatedly perform, on a polygon-group-by-polygon-group basis, the determination on the polygon group and the determination on the polygons included in the polygon group.

As described above, the divided-area-based rendering device 600 is capable of reducing an amount of processing in the determination processing by performing the determination on a polygon-by-polygon basis after performing the rough determination on a polygon-group-by-polygon-group basis.

Although the example is described above where both the area-by-polygon-group table 636 and the area-by-polygon table 136 are used, only the area-by-polygon-group table 636 may be used. Moreover, since processing when only the area-by-polygon-group table 636 is used is the same as processing when the "polygon" is replaced with the "polygon group" in the description of Embodiment 1, a detailed description thereof is omitted. When only the area-by-polygon-group table 636 is used, it is possible to reduce a capacity of the table and an amount of processing in the generation processing, but the accuracy of determining a polygon included in a divided area decreases, as compared to when only the area-by-polygon table 136 is used.

Here, a unit including one or more polygons is defined as a unit polygon. Stated differently, the unit polygon is one polygon or polygon group. In this case, it is possible to replace the "polygon" or "polygon group" in each of the embodiments with the "unit polygon."

Although the divided-area-based rendering device according to the embodiments has been described above, the present invention is not limited to these embodiments.

Moreover, each processing unit included in the divided-area-based rendering device according to the embodiments is typically realized as an LSI (Large Scale Integration) that is an integrated circuit. These LSIs may be integrated into individual chips, or into a single chip so as to include part or all of the LSIs.

Furthermore, circuit integration is not limited to the LSI, but may be realized with a dedicated circuit or a general-purpose processor. FPGA (Field Programmable Gate Array) permitting programming after the manufacture of the LSI or a reconfigurable processor which can reconfigure connection or setting of circuit cells in the LSI may be used.

It is to be noted that in the embodiments, each structural element may be implemented with dedicated hardware or realized by executing a software program suitable for the structural element. Each structural element may be realized by a program executing unit such as a CPU and a processor reading and executing a software program stored in a recording medium such as a hard disk and a semiconductor memory.

Moreover, the present invention may be the program or a non-transitory computer-readable recording medium on which the program is recorded. In addition, it goes without saying that the program can be distributed via a transmission medium such as the Internet.

Furthermore, all the numbers used above are exemplary for specifically describing the present invention, and the present invention is not limited to these exemplary numerals.

Furthermore, the divisions of the functional blocks in the block diagrams are exemplary, and the functional blocks may be achieved as one functional block, one functional block may be divided into functional blocks, or some of the functions may be transferred to another functional block. In addition, the functions of functional blocks having similar functions may be processed by single hardware or software in parallel or in a time-sharing manner.

Moreover, the orders in which the above steps are performed are exemplary for specifically describing the present invention, and orders other than the orders may be used. In addition, some of the steps may be performed at the same time as (in parallel with) other steps.

Although the divided-area-based rendering device according to one or more aspects has been described above based on the embodiments, the present invention is not limited to these embodiments. Those skilled in the art will readily appreciate that various modifications may be made in the embodiments and that other embodiments may be obtained by combining the structural elements in the different embodiments, without departing from the spirit of the present invention. Accordingly, all such modifications and embodiments may be included in the scope of the one or more aspects.

INDUSTRIAL APPLICABILITY

The present invention is useful as a graphics display system used for embedded devices of which the memory efficiency and the bandwidth efficiency are required. For instance, the present invention can be applied to cellular phones, televisions, and so on.

REFERENCE SIGNS LIST

100, 200, 300, 600 Divided-area-based rendering device
101, 301 Display list holding unit
102, 302 Polygon data holding unit
110, 210, 310, 610 Polygon shape processing unit
111, 111A, 111B, 311 Command receiving unit
112, 312 Coordinate converting unit
113, 213, 613 Table generating unit
114, 214, 614 Table holding unit
115 Divided area setting unit
120, 220, 620 Polygon-by-area rendering unit
121, 221, 621 Determining unit
122, 322 Area rendering unit
123 Rendering region setting unit
131, 334 Rendering command
132, 332B Polygon data
132A, 332A Vertex coordinates
132B Attribute data
135, 335 Screen coordinates
136, 236 Area-by-polygon table
137, 337 Pixel data
237 Polygon attribute table
313 Polygon area calculating unit 314 List holding unit
320 Rasterizing unit
321 Polygon list obtaining unit
331 Display list
336 Polygon-by-area list
401 Final rendering region
402 Divided area
403 Internal memory region
411 Rendering start command
421, 431, 432, 433, 434, 435, 436, 437, 438, 439, 441, 442, 451, 452, 454, 455, 461, 462, 464, 481, 482, 483, 484 Polygon
422A, 422B, 422C, 424, 425 Vertex
423, 443, 453, 456, 495 Boundary box
471, 472, 473, 474, 475, 491, 492, 493, 494 Region
485 Polygon group
501 Information
502 Polygon attribute
636 Area-by-polygon-group table

The invention claimed is:

1. A divided-area-based rendering device comprising:
a command receiving unit configured to receive a rendering command indicating a plurality of unit polygons which are to be rendered in a rendering region and each of which includes one or more polygons;
a coordinate converting unit configured to convert, for each of the unit polygons indicated in the rendering command, vertex coordinates of the unit polygon in a three-dimensional space into screen coordinates in a two-dimensional plane;
a table generating unit configured to, (i) for each unit polygon, calculate a first area including the unit polygon in the two-dimensional plane, using the screen coordinates, and compute, among a plurality of divided areas obtained by dividing the rendering region, a divided area including at least part of the first area, and (ii) generate, using results of the computation for the unit polygons, an area table that is a table in which, for each unit polygon, the divided area including the at least part of the first area including the unit polygon is associated with the unit polygon;
a determining unit configured to determine a rendering unit polygon for each of the divided areas by referring to the area table, the rendering unit polygon being one of the unit polygons which is associated with the divided area; and
an area rendering unit configured to perform, for each divided area, vertex processing and rasterization on the rendering unit polygon,
wherein the area table includes a fixed number of entries,
the table generating unit is configured to store, into each of the entries, area information indicating the divided area including the at least part of the first area and associated with the unit polygon,
when the number of the unit polygons is greater than the fixed number, the table generating unit is configured to:
divide the unit polygons into the fixed number of groups each of which includes at least one unit polygon;
for each of the fixed number of the groups, calculate, a second area including the at least one unit polygon in the two-dimensional plane which is included in the group, using the screen coordinates, and compute, among the divided areas, a divided area including at least part of the second area; and
generate, using results of the computation for the fixed number of the groups, the area table that is a table in which, for each group, the divided area including the at least part of the second area including the at least one unit polygon included in the group is associated with the group, and
the determining unit is configured to determine the rendering unit polygon for each of the divided areas by referring to the area table, the rendering unit polygon being, among the unit polygons, a unit polygon included in the group associated with the divided area.

2. The divided-area-based rendering device according to claim 1,
wherein the table generating unit is configured to:
sequentially select, as a target unit polygon, one of the unit polygons;
generate, for each of the selected target unit polygons, the area information about the target unit polygon, and store the area information into, among the entries, an entry that does not hold the area information;
determine, when storing area information about a new unit polygon into an entry, whether the number of area information items stored in the area table is greater than the fixed number as a result of storing the area information;
calculate, when the number of the area information items is greater than the fixed number, the second area including the new unit polygon and the unit polygon corresponding to the area information stored in a selected entry that is one of the entries, using the area information stored in the selected entry and the area information about the new unit polygon; and
store, into the selected entry, the area information indicating the divided area including the at least part of the calculated second area.

3. The divided-area-based rendering device according to claim 1,
wherein the table generating unit is configured to:
sequentially select, as a target unit polygon, one of the unit polygons;
generate, for each of the selected target unit polygons, the area information about the target unit polygon, and store the area information into, among the entries, an entry that does not hold the area information;
determine, when storing area information about a new unit polygon into an entry, whether the number of area information items stored in the area table is greater than the fixed number as a result of storing the area information;
calculate, when the number of the area information items is greater than the fixed number, the second area including the unit polygon corresponding to the area information stored in a first entry among the entries and the unit polygon corresponding to the area information stored in a second entry among the entries, using the two area information items stored in the first entry and the second entry;
store, into the first entry, the area information indicating the divided area including the at least part of the calculated second area; and
store, into the second entry, the area information about the new unit polygon.

4. The divided-area-based rendering device according to claim 1,
wherein the first area is a smallest rectangular area including all the unit polygons.

5. The divided-area-based rendering device according to claim 4,
wherein the area information indicates, among vertices of the first area, vertices that are diagonal to each other.

6. The divided-area-based rendering device according to claim 1, wherein the area information has a predetermined number of bits each one of which is associated with a different one of unit areas each including one or more of the divided areas, and the one bit indicates whether the unit area associated with the one bit includes the at least part of the first area corresponding to the unit polygon corresponding to the entry.

7. The divided-area-based rendering device according to claim 4, wherein the area information includes:

first information indicating a divided area including, among vertices of the first area, vertices that are diagonal to each other; and second information having a predetermined number of bits each of which is associated with a different one of unit areas each including the divided areas, the one bit indicates whether the associated unit area includes the at least part of the first area corresponding to the unit polygon corresponding to the entry, and the determining unit is configured to determine a unit polygon as the rendering unit polygon for each of the divided areas, the unit polygon being one of the unit polygons which is associated with the divided area in the first information and with the unit area including the divided area in the second information.

8. The divided-area-based rendering device according to claim 1, wherein the coordinate converting unit is further configured to determine, using the screen coordinates, whether each of the unit polygons is a valid unit polygon or an invalid unit polygon, the valid unit polygon being a unit polygon at least part of which is displayed in the rendering region, and the invalid unit polygon being a unit polygon whole of which is not displayed in the rendering region, the table generating unit is configured to store the area information into the entry when the target unit polygon is the invalid unit polygon, the area information indicating that the target unit polygon is the invalid unit polygon, and the determining unit is configured to exclude the target unit polygon from a rendering target when the area information in the area table indicates that the target unit polygon is the invalid unit polygon.

9. The divided-area-based rendering device according to claim 1, wherein the coordinate converting unit is further configured to divide the unit polygon into a plurality of divided unit polygons by clipping using the screen coordinates, and the table generating unit is configured to calculate the first area including all of the divided unit polygons when the clipping is performed on the target unit polygon, and store, into one of the entries, the area information indicating the divided area including the at least part of the calculated first area.

10. The divided-area-based rendering device according to claim 1, wherein the table generating unit is configured to sequentially select, as target unit polygons, the unit polygons according to an order of data of the unit polygons included in the rendering command, and the determining unit is configured to associate, using the order, the unit polygons and the area information items stored in the entries.

11. The divided-area-based rendering device according to claim 1, wherein the table generating unit is configured to sequentially select, as target unit polygons, the unit polygons according to identification numbers unique to the unit polygons included in the rendering command, and the determining unit is configured to associate, using the identification numbers, the unit polygons and the area information items stored in the entries.

12. The divided-area-based rendering device according to claim 1, wherein the coordinate converting unit is further configured to determine, using the screen coordinates, whether each of the unit polygons is a valid unit polygon or an invalid unit polygon, the valid unit polygon being a unit polygon at least part of which is displayed in the rendering region, and the invalid unit polygon being a unit polygon whole of which is not displayed in the rendering region, the table generating unit is further configured to count, among the unit polygons, the number of the valid unit polygons that are consecutive and the number of the invalid unit polygons that are consecutive, and generate a polygon attribute table indicating the number of the consecutive valid unit polygons and the number of the consecutive invalid unit polygons, and the determining unit is further configured to determine, by referring to the polygon attribute table, whether each of the unit polygons is the valid unit polygon or the invalid unit polygon, and determine the rendering unit polygon for each of the divided areas by referring to the area table, the rendering unit polygon being one of the valid unit polygons which is associated with the divided area.

13. The divided-area-based rendering device according to claim 1, wherein the unit polygon is a polygon group including a plurality of polygons, the table generating unit is configured to generate, as the area table, (i) a first area table that is a table in which, for each of a plurality of the polygon groups, the divided area including the at least part of the first area including the polygon group is associated with the polygon group and (ii) a second area table that is a table in which, for each of the polygons, the divided area including the at least part of the first area including the polygon is associated with the polygon, the determining unit is configured to determine, for each of the divided areas:

a rendering polygon group by referring to the first area table, the rendering polygon group being one of the polygon groups which is associated with the divided area; and a rendering polygon by referring to the second area table, the rendering polygon being one of the polygons which is associated with the divided area, and the area rendering unit is configured to perform, for each divided area, the vertex processing and the rasterization on the rendering polygon.

14. A divided-area-based rendering method comprising:

receiving a rendering command indicating a plurality of unit polygons which are to be rendered in a rendering region and each of which includes one or more polygons;

converting, for each of the unit polygons indicated in the rendering command, vertex coordinates of the unit polygon in a three-dimensional space into screen coordinates in a two-dimensional plane;

(i) for each unit polygon, calculating a first area including the unit polygon in the two-dimensional plane, using the screen coordinates, and computing, among a plurality of divided areas obtained by dividing the rendering region, a divided area including at least part of the first area, and (ii) generating, using results of the computation for the unit polygons, an area table that is a table in which, for each unit polygon, the divided area including the at least part of the first area including the unit polygon is associated with the unit polygon;

determining a rendering unit polygon for each of the divided areas by referring to the area table, the rendering unit polygon being one of the unit polygons which is associated with the divided area; and performing, for each divided area, vertex processing and rasterization on the rendering unit polygon, wherein the area table includes a fixed number of entries, in the calculating, computing, and generating, area information indicating the divided area including the at least part of the first area and associated with the unit polygon is stored, into each of the entries, when the number of the unit polygons is greater than the fixed number, in the calculating, computing, and generating:

the unit polygons are divided into the fixed number of groups each of which includes at least one unit polygon;

a second area including the at least one unit polygon in the two-dimensional plane which is included in the group is calculated for each of the fixed number of the groups, using the screen coordinates, and among the divided areas, a divided area including at least part of the second area is computed; and the area table that is a table in which, for each group, the divided area including the at least part of the second area including the at least one unit polygon included in the group is associated with the group is generated, using results of the computation for the fixed number of the groups, and in the determining, the rendering unit polygon is determined for each of the divided areas by referring to the area table, the rendering unit polygon being, among the unit polygons, a unit polygon included in the group associated with the divided area.

15. A non-transitory computer-readable recording medium for use in a computer, the recording medium having a computer program recorded thereon for causing a computer to execute the divided-area-based rendering method according to claim 14.

16. An integrated circuit comprising:

a command receiving unit configured to receive a rendering command indicating a plurality of unit polygons which are to be rendered in a rendering region and each of which includes one or more polygons;

a coordinate converting unit configured to convert, for each of the unit polygons indicated in the rendering command, vertex coordinates of the unit polygon in a three-dimensional space into screen coordinates in a two-dimensional plane;

a table generating unit configured to, (i) for each unit polygon, calculate a first area including the unit polygon in the two-dimensional plane, using the screen coordinates, and compute, among a plurality of divided areas obtained by dividing the rendering region, a divided area including at least part of the first area, and (ii) generate, using results of the computation for the unit polygons, an area table that is a table in which, for each unit polygon, the divided area including the at least part of the first area including the unit polygon is associated with the unit polygon;

a determining unit configured to determine a rendering unit polygon for each of the divided areas by referring to the area table, the rendering unit polygon being one of the unit polygons which is associated with the divided area; and an area rendering unit configured to perform, for each divided area, vertex processing and rasterization on the rendering unit polygon, wherein the area table includes a fixed number of entries, the table generating unit is configured to store, into each of the entries, area information indicating the divided area including the at least part of the first area and associated with the unit polygon, when the number of the unit polygons is greater than the fixed number, the table generating unit is configured to:

divide the unit polygons into the fixed number of groups each of which includes at least one unit polygon;

for each of the fixed number of the groups, calculate, a second area including the at least one unit polygon in the two-dimensional plane which is included in the group, using the screen coordinates, and compute, among the divided areas, a divided area including at least part of the second area; and generate, using results of the computation for the fixed number of the groups, the area table that is a table in which, for each group, the divided area including the at least part of the second area including the at least one unit polygon included in the group is associated with the group, and the determining unit is configured to determine the rendering unit polygon for each of the divided areas by referring to the area table, the rendering unit polygon being, among the unit polygons, a unit polygon included in the group associated with the divided area.

* * * * *